(12) United States Patent
Ryan et al.

(10) Patent No.: US 7,865,817 B2
(45) Date of Patent: Jan. 4, 2011

(54) INVARIANT REFERENCING IN DIGITAL WORKS

(75) Inventors: Thomas A. Ryan, Los Gatos, CA (US); Robert L. Goodwin, Mercer Island, WA (US); John Lattyak, Los Gatos, CA (US)

(73) Assignee: Amazon Technologies, Inc., Reno, NV (US)

(*) Notice: Subject to any disclaimer, the term of this patent is extended or adjusted under 35 U.S.C. 154(b) by 404 days.

(21) Appl. No.: 11/693,677

(22) Filed: Mar. 29, 2007

(65) Prior Publication Data

US 2008/0163039 A1 Jul. 3, 2008

Related U.S. Application Data

(60) Provisional application No. 60/882,870, filed on Dec. 29, 2006.

(51) Int. Cl.
*G06F 17/21* (2006.01)

(52) U.S. Cl. .................. 715/232; 715/233; 715/238; 715/206

(58) Field of Classification Search .......... 715/206, 715/238, 864, 232, 233
See application file for complete search history.

(56) References Cited

U.S. PATENT DOCUMENTS

| | | | |
|---|---|---|---|
| 4,622,627 A | | 11/1986 | Rodriguez et al. |
| 5,566,098 A | | 10/1996 | Lucente et al. |
| 5,663,748 A | | 9/1997 | Huffman et al. |
| 5,710,922 A | * | 1/1998 | Alley et al. ............ 1/1 |
| 5,742,905 A | | 4/1998 | Pepe et al. |
| 5,761,485 A | | 6/1998 | Munyan |
| 5,765,168 A | * | 6/1998 | Burrows ............ 1/1 |
| 5,847,698 A | | 12/1998 | Reavey et al. |
| 5,892,900 A | | 4/1999 | Ginter et al. |
| 5,956,048 A | | 9/1999 | Gaston |
| 5,960,411 A | | 9/1999 | Hartman et al. |
| 6,037,954 A | | 3/2000 | McMahon |
| 6,047,189 A | | 4/2000 | Yun et al. |

(Continued)

FOREIGN PATENT DOCUMENTS

WO     WO9720274     6/1997

(Continued)

OTHER PUBLICATIONS

Cleveland, Jr. et al., "Questions and Answers about Biological Effects and Potential Hazards of Radiofrequency Electromagnetic Fields" OET Bulletin 56, Fourth Edition, Aug. 1999, 38 pages.

(Continued)

*Primary Examiner*—William L Bashore
*Assistant Examiner*—Daeho D Song
(74) *Attorney, Agent, or Firm*—Lee & Hayes, PLLC

(57) ABSTRACT

A method of presenting a digital work includes displaying a portion of the digital work on a display screen under a set of display conditions, and providing one or more invariant location reference identifiers corresponding to the portion of the digital work on the display screen. The invariant location reference identifiers are separate from the digital work, and each invariant location reference identifier is provided along with the corresponding portion of the digital work, regardless of the display conditions under which the portion of the digital work is displayed.

27 Claims, 12 Drawing Sheets

U.S. PATENT DOCUMENTS

| | | | |
|---|---|---|---|
| 6,049,796 A * | 4/2000 | Siitonen et al. ................... 1/1 |
| 6,233,318 B1 | 5/2001 | Picard et al. |
| 6,313,828 B1 | 11/2001 | Chombo |
| 6,331,867 B1 | 12/2001 | Eberhard et al. |
| 6,351,750 B1 | 2/2002 | Duga et al. |
| 6,385,596 B1 | 5/2002 | Wiser et al. |
| 6,449,627 B1 | 9/2002 | Baer et al. |
| 6,496,803 B1 | 12/2002 | Seet et al. |
| 6,529,920 B1 | 3/2003 | Arons et al. |
| 6,721,869 B1 * | 4/2004 | Senthil ................ 711/202 |
| 6,735,583 B1 | 5/2004 | Bjarnestam et al. |
| 6,847,966 B1 | 1/2005 | Sommer et al. |
| 6,904,449 B1 | 6/2005 | Quinones |
| 6,933,928 B1 | 8/2005 | Lilienthal |
| 6,938,076 B2 | 8/2005 | Meyer et al. |
| 6,985,932 B1 | 1/2006 | Glaser et al. |
| 6,999,565 B1 | 2/2006 | Delaney et al. |
| 7,007,015 B1 | 2/2006 | Nayak |
| 7,009,596 B2 | 3/2006 | Seet et al. |
| 7,010,500 B2 | 3/2006 | Aarnio |
| 7,020,654 B1 | 3/2006 | Najmi |
| 7,103,848 B2 | 9/2006 | Barsness et al. |
| 7,165,217 B1 | 1/2007 | Kondo |
| 7,188,085 B2 | 3/2007 | Pelletier |
| 7,209,888 B2 | 4/2007 | Frid-Nielsen et al. |
| 7,249,060 B2 | 7/2007 | Ling |
| 7,257,577 B2 | 8/2007 | Fagin et al. |
| 7,287,068 B1 | 10/2007 | Eriksson et al. |
| 7,298,851 B1 | 11/2007 | Hendricks et al. |
| 7,304,635 B2 | 12/2007 | Seet et al. |
| 7,350,704 B2 | 4/2008 | Barsness et al. |
| 7,355,591 B2 | 4/2008 | Sugimoto |
| 7,386,480 B2 | 6/2008 | Sarig |
| 7,398,244 B1 | 7/2008 | Keith |
| 7,401,286 B1 | 7/2008 | Hendricks et al. |
| 7,454,238 B2 | 11/2008 | Vinayak et al. |
| 7,509,270 B1 | 3/2009 | Hendricks et al. |
| 7,533,152 B2 | 5/2009 | Stark et al. |
| 7,562,032 B2 | 7/2009 | Abbosh et al. |
| 7,656,127 B1 | 2/2010 | Shutt et al. |
| 7,657,459 B2 | 2/2010 | Anderson et al. |
| 7,680,849 B2 | 3/2010 | Heller et al. |
| 2001/0007980 A1 | 7/2001 | Ishibashi et al. |
| 2001/0027478 A1 | 10/2001 | Meier et al. |
| 2001/0037328 A1 | 11/2001 | Pustejovsky et al. |
| 2001/0049623 A1 | 12/2001 | Aggarwal et al. |
| 2001/0053975 A1 * | 12/2001 | Kurihara ................ 704/260 |
| 2002/0010759 A1 | 1/2002 | Hitson et al. |
| 2002/0035697 A1 | 3/2002 | McCurdy et al. |
| 2002/0092031 A1 | 7/2002 | Dudkiewicz et al. |
| 2002/0101447 A1 * | 8/2002 | Carro ................ 345/760 |
| 2002/0103809 A1 | 8/2002 | Starzl et al. |
| 2002/0120635 A1 | 8/2002 | Joao |
| 2002/0123336 A1 | 9/2002 | Kamada |
| 2002/0129012 A1 | 9/2002 | Green |
| 2002/0138291 A1 | 9/2002 | Vaidyanathan et al. |
| 2002/0147724 A1 | 10/2002 | Fries et al. |
| 2002/0184319 A1 | 12/2002 | Willner et al. |
| 2003/0018720 A1 | 1/2003 | Chang et al. |
| 2003/0028395 A1 | 2/2003 | Rodgers et al. |
| 2003/0040970 A1 | 2/2003 | Miller |
| 2003/0046233 A1 | 3/2003 | Ara et al. |
| 2003/0058265 A1 | 3/2003 | Robinson et al. |
| 2003/0069812 A1 | 4/2003 | Yuen et al. |
| 2003/0097354 A1 | 5/2003 | Finlay et al. |
| 2003/0110503 A1 | 6/2003 | Perkes |
| 2003/0135495 A1 | 7/2003 | Vagnozzi |
| 2003/0152894 A1 | 8/2003 | Townshend |
| 2003/0163399 A1 | 8/2003 | Harper et al. |
| 2003/0164844 A1 | 9/2003 | Kravitz et al. |
| 2003/0182551 A1 | 9/2003 | Frantz et al. |
| 2003/0212613 A1 | 11/2003 | Sarig |
| 2004/0003398 A1 | 1/2004 | Donian et al. |
| 2004/0044723 A1 | 3/2004 | Bell et al. |
| 2004/0054499 A1 | 3/2004 | Starzyk et al. |
| 2004/0098350 A1 | 5/2004 | Labrou et al. |
| 2004/0117189 A1 | 6/2004 | Bennett |
| 2004/0139400 A1 | 7/2004 | Allam et al. |
| 2004/0167822 A1 | 8/2004 | Chasen et al. |
| 2004/0201633 A1 | 10/2004 | Barsness et al. |
| 2004/0205457 A1 | 10/2004 | Bent et al. |
| 2004/0212941 A1 | 10/2004 | Haas et al. |
| 2004/0267552 A1 | 12/2004 | Gilliam et al. |
| 2004/0268253 A1 | 12/2004 | DeMello et al. |
| 2005/0021464 A1 | 1/2005 | Lindauer et al. |
| 2005/0022113 A1 * | 1/2005 | Hanlon ................ 715/511 |
| 2005/0044148 A1 | 2/2005 | Son et al. |
| 2005/0044224 A1 | 2/2005 | Jun et al. |
| 2005/0125222 A1 | 6/2005 | Brown et al. |
| 2005/0144895 A1 | 7/2005 | Grimes et al. |
| 2005/0176438 A1 | 8/2005 | Li |
| 2005/0193330 A1 | 9/2005 | Peters |
| 2005/0195975 A1 | 9/2005 | Kawakita |
| 2005/0198070 A1 | 9/2005 | Lowry |
| 2005/0222977 A1 | 10/2005 | Zhou et al. |
| 2005/0256822 A1 | 11/2005 | Hollingsworth |
| 2006/0004840 A1 | 1/2006 | Senda |
| 2006/0020469 A1 | 1/2006 | Rast |
| 2006/0048184 A1 | 3/2006 | Poslinski et al. |
| 2006/0071754 A1 | 4/2006 | Tofts et al. |
| 2006/0075205 A1 | 4/2006 | Martin et al. |
| 2006/0098900 A1 | 5/2006 | King et al. |
| 2006/0129618 A1 | 6/2006 | Maier |
| 2006/0161635 A1 | 7/2006 | Lamkin et al. |
| 2006/0175983 A1 | 8/2006 | Crouse et al. |
| 2006/0179137 A1 | 8/2006 | Jennings, III et al. |
| 2006/0190568 A1 | 8/2006 | Patterson |
| 2006/0256083 A1 | 11/2006 | Rosenberg |
| 2006/0281058 A1 | 12/2006 | Mangoaela |
| 2007/0050346 A1 | 3/2007 | Goel et al. |
| 2007/0061335 A1 | 3/2007 | Ramer et al. |
| 2007/0118533 A1 | 5/2007 | Ramer et al. |
| 2007/0136679 A1 | 6/2007 | Yang |
| 2007/0174545 A1 | 7/2007 | Okada et al. |
| 2007/0189719 A1 | 8/2007 | Furumachi et al. |
| 2007/0219983 A1 | 9/2007 | Fish |
| 2007/0233562 A1 | 10/2007 | Lidwell et al. |
| 2007/0233692 A1 | 10/2007 | Lisa et al. |
| 2007/0240187 A1 | 10/2007 | Beach et al. |
| 2007/0282809 A1 | 12/2007 | Hoeber et al. |
| 2007/0283173 A1 | 12/2007 | Webb et al. |
| 2008/0005097 A1 | 1/2008 | Kleewein et al. |
| 2008/0040233 A1 | 2/2008 | Wildman et al. |
| 2008/0082518 A1 | 4/2008 | Loftesness |
| 2008/0082911 A1 * | 4/2008 | Sorotokin et al. ........... 715/236 |
| 2008/0113614 A1 | 5/2008 | Rosenblatt |
| 2008/0133479 A1 | 6/2008 | Zelevinsky et al. |
| 2008/0163039 A1 | 7/2008 | Ryan et al. |
| 2008/0164304 A1 | 7/2008 | Narasimhan et al. |
| 2008/0168073 A1 | 7/2008 | Siegel et al. |
| 2008/0208833 A1 | 8/2008 | Basmov |
| 2008/0243788 A1 | 10/2008 | Reztlaff, II et al. |
| 2008/0243828 A1 | 10/2008 | Reztlaff, II et al. |
| 2008/0293450 A1 | 11/2008 | Ryan et al. |
| 2008/0294674 A1 | 11/2008 | Reztlaff, II et al. |
| 2008/0295039 A1 | 11/2008 | Nguyen et al. |

FOREIGN PATENT DOCUMENTS

| WO | WO0045588 | 8/2000 |
|----|-----------|--------|
| WO | WO0239206 | 5/2002 |

OTHER PUBLICATIONS

Cleveland, Jr., et al, "Evaluating Compliance with FCC Guidelines for Human Exposure to Radiofrequency Electromagnetic Fields" OET Bulletin 65, Edition 97-01, Aug. 1997, 84 pages.

Means, et al., "Evaluating Compliance with FCC Guidelines for Human Exposure to Radiofrequency Electromagnetic Fields", OET Bulletin 65 Edition 97-01, Jun. 2001, 57 pages.

OQO "A Full PC That Fits in Your Pocket" Retrieved on Sep. 22, 2008 at <<http://www.oqo.com/support/documentation.html>>.

PCT Search Report for International Application No. PCT/US08/57848, mailed Jul. 7, 2008 (9 pages).

PCT Search Report for International Application No. PCT/US08/64387, mailed Sep. 9, 2008 (2 pages).

International Search Report, Application No. PCT/US/08/57829, filed Mar. 21, 2008, 2 pages.

International Search Report, Application No. PCT/US/07/89105, filed Dec. 28, 2007, 4 pages.

U.S. Appl. No. 11/277,894, filed Mar. 29, 2006, Jateen P. Parekh, Gregg E. Zehr, and Subram Narasimhan, "Reader Device Content Indexing".

Bradley, "Plastic Shape Shifter", retreived on May 7, 2009 at <<http://www.reactivereports.com/61/61_3.html>>, Chemistry WebMagazine, Issue No. 61, Dec. 2006, 2 pgs.

Cavanaugh "EBooks and Accommodations", Teaching Expectional Children vol. 35 No. 2 p. 56-61 Copyright 2002 CEC.

Chi et al. "eBooks with Indexes that Reorganize Conceptually", CHI2004, Apr. 24-29, 2004, Vienna, Austria ACM 1-58113-703-6/04/0004.

Davison et al. "The Use of eBooks and Interactive Multimedia, as Alternative Forms of Technical Documentation" SIGDOC'05, Sep. 21-23, 2005, Conventry, United Kingdom, Copyright 2005 ACM 1-59593-175-9/5/0009.

Elspass, et al., "Portable Haptic Interface with Active Functional Design", In Proceedings SPIE Conference on Smart Structures and Integrated Systems, Newport Beach, California, vol. 3668, Mar. 1999, 926-932.

"Haptic History—Machine Haptics (Expansion)" retrieved on May 7, 2009 at <<http://hapticshistory.chc61.uci.cu/haptic/site/pages/Machine-Haptics-Became_5.php.>> from Google's cache, text-only version as webpage appeared on Apr. 16, 2009, 8 pgs.

Jones, et al., "Development of a Tactile Vest", IEEE Computer Society, In the Proceedings of the 12th International Symposium on Haptic Interfaces for Virtual Environment and Teleoperator Systems, Mar. 27-28, 2004, pp. 82-89.

Leutwyler, "Shape-shifting Polymer Gels", retrieved on May 7, 2009 at <<http://www.scientificamerican.com/article.cfm?id=shape-shifting-polymer-ge&print=true>>, Scientific American, Nov. 9, 2000, 1 pg.

Nakatani, et al., "3D Form Display with Shape Memory Alloy", In Proceedings of 13th International Conference on Artificial Reality and Teleexistence (ICAT), 2003, pp. 179-184.

"Shape Memory Polymer", retrieved on May 7, 2009 at <<http://en.wikipedia.org/wiki/Shape_Memory_Polymer>>, Wikipedia, 8 pgs.

Sohn et al. "Development of a Standard Format for eBooks", SAC2002, Madrid, Spain, 2002 ACM 1-58113-445-2/02/0.

Wellman, et al., "Mechanical Design and Control of a High-Bandwidth Shape Memory Alloy Tactile Display", Springer-Verlag, In the Proceedings of the International Symposium on Experimental Robotics, Barcelona, Spain, Jun. 1997, pp. 56-66, 12 pgs.

Yoshikawa, et al., "Vertical Drive Micro Actuator for Haptic Display Using Shape Memory Alloy Thin Film", IEE Japan, Papers of Technical Meeting on Micromachine and Sensor System, Journal Code L2898B, vol. MSS-05, No. 21-44, 2005, pp. 103-108.

Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>>, 6 pages.

PCT Search Report for PCT Application No. PCT/US10/22060, mailed Mar. 8, 2010 (7 pages).

"A Universally Unique IDentifier (UUID) URN Namespace", Jul. 2005, IETF, all pages. Retrieved on Apr. 21, 2010 at http://tools.ietf.org/pdf/rfc4122.pdf, 33 pages.

Bellwood, et al., "UUDI Version 2.04 API Specification UDDI Committee Specification, Jul. 19, 2002", Oasis, all pages. Retrieved on Apr. 21, 2010 via Wayback Machine at http://web.archive.org/web/20050314033213/www.oasis-open.org/committees/uddi-spec/doc/tcspecs.htm, 95 pages.

"Universal Unique Indentifier", dated Dec. 16, 2002. The Open Group, all pages. Retrieved on Apr. 21, 2010 via Wayback Machine at http://web.archive.org/web/20021216070918/http://www.opengroup.org/onlinepubs/9629399/apdxa.htm, 9 pages.

"Web Services Architecture: W3C Working Group Note Feb. 11, 2004", Feb. 11, 2004, W3C, all pages. Retrieved on Apr. 21, 2010 via Wayback Machine at http://web.archive.org/web/2004040205185/http://www.w3.org/TR/ws-arch/, 100 pages.

U.S. Appl. No. 11/537,484, filed on Sep. 29, 2006, Thomas Ryan, "Expedited Acquisition of a Digital Item Following a Sample Presentation of the Item.".

U.S. Appl. No. 11/537,518, filed on Sep. 29, 2006, John Lattyak, "Acquisition of an Item based on a Catalog Presentation of Items.".

U.S. Appl. No. 11/693,685, filed on Mar. 29, 2007, John Lattyak; John Kim; Steven Moy; Laurent An Minh Nguyen, "Relative Progress and Event Indicators.".

U.S. Appl. No. 11/763,314, filed on Jun. 14, 2007, John Lattyak; Craig Griffin; Steven Weiss, "Display Dependent Markup Language.".

U.S. Appl. No. 11/763,339, filed on Jun. 14, 2007, David Isbister; Marshall Williams; Nicholas Vaccaro, "Power Management Techniques for a User Device.".

U.S. Appl. No. 11/763,375, filed on Jun. 14, 2007, James Rezlaff II; John Lattyak, "Obtaining and Verifying Search Indices.".

U.S. Appl. No. 11/763,363, filed on Jun. 14, 2007, James Reztlaff II; Thomas Ryan, "Search Results Generation and Sorting.".

U.S. Appl. No. 11/763,375, filed on Jun. 14, 2007, John Lattyak, Girish Bansil Bajaj, Kevin R. Cheung, Thomas Fruchterman, Robert L. Goodwin, Kenneth P. Kiraly, Richard Moore, Subram Narasimhan, Thomas A. Ryan, Michael V. Rykov, Jon Saxton, James C. Slezak, Beryl Tomay, Aviram, Zagorie, Gregg Elliott Zehr, "Delivery of Items Consumption by a User Device.".

U.S. Appl. No. 11/763,376, filed on Jun. 14, 2007, Kenneth Kiraly; Thomas Ryan; Gregg Zehr; John Lattyak; Michael Rykov; Girish Bansilal Bajaj; James Slezak; Aviram Zagorie; Richard Moore; Kevin Cheung; Thomas Fruchterman; Robert Goodwin, "Notification of a User Device to Perform an Action.".

U.S. Appl. No. 11/763,378, filed on Jun. 14, 2007, John Lattyak; Thomas Ryan; Gregg Zehr; Kenneth Kiraly; Michael Rykov; Girish Bansilal Bajaj; James Slezak; Aviram Zagorie; Richard Moore; Kevin Cheung; Thomas Fruchterman; Robert Goodwin; Xiaotian Guo, "Transfer of Instructions to a User Device.".

U.S. Appl. No. 11/763,381, filed on Jun. 14, 2007, Michael Rykov; Girish Bansilal Bajaj; James Slezak; Aviram Zagorie; Richard Moore; Kevin Cheung; Thomas Fruchterman; Robert Goodwin, "Selecting and Providing Items in a Media Consumption System.".

U.S. Appl. No. 11/763,386, filed on Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin, "Handling of Subscription-Related Issues in a Media Consumption System.".

U.S. Appl. No. 11/763,390, filed on Jun. 14, 2007, Girish Bansilal Bajaj; Michael Rykov; James Slezak; Aviram Zagorie; Richard Moore; Kevin Cheung; Thomas Fruchterman; Robert Goodwin,, "Providing User-Supplied Items to a User Device.".

U.S. Appl. No. 11/763,392, filed on Jun. 14, 2007, Thomas Ryan; Gregg Zehr; Kenneth Kiraly; John Lattyak; Subram Narasimhan; Michael Rykov; Girish Bansilal Bajaj; James Slezak; Aviram Zagorie; Richard Moore; Kevin Cheung; Thomas Fruchterman; Robert Goodwin, "Administrative Tasks in a Media Consumption System .".

U.S. Appl. No. 11/763,393, filed on Jun. 14, 2007, John Lattyak; Michael Rykov; Girish Bansilal Bajaj; James Slezak; Aviram Zagorie; Richard Moore; Kevin Cheung; Thomas Fruchterman; Robert Goodwin "Incremental Updates of Items .".

U.S. Appl. No. 11/763,395, filed on Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin; James Reztlaff II, "Providing Supplemental Information Based on Hints in a Media Consumption System.".

U.S. Appl. No. 11/963,618, filed on Dec. 21, 2007, Michael Rykov; Laurent An Minh Nguyen; Steven Moy, "Dissemination of Periodical Samples.".

U.S. Appl. No. 12/333,215, filed on Dec. 11, 2008, Aviram Zagorie; Craig Griffin; John Lattyak; Michael Rykov, "Device-Specific Presentation Control for Electronic Book Reader Devices.".

U.S. Appl. No. 12/351,629, filed on Jan. 9, 2009, John Johnston; Weiping Dou; Steven Chase, "Antenna Placement on Portable Device .".

U.S. Appl. No. 12/351,663, filed on Jan. 9, 2009, Chris Li; Steven Chase, "Surface Mount Clip for Routing and Grounding Cables.".

Cleveland, Jr. et al., "Questions and Answers about Biological Effects and Potential Hazards of Radiofrequency Electromagnetic Fields" OET Bulletin 56, Fourth Edition, Aug. 1999, 38 pages.

Cleveland, Jr., et al, "Evaluating Compliance with FCC Guidelines for Human Exposure to Radiofrequency Electromagnetic Fields" OET Bulletin 65, Edition 97-01, Aug. 1997, 84 pages.

Means, et al., "Evaluating Compliance with FCC Guidelines for Human Exposure to Radiofrequency Electromagnetic Fields", OET Bulletin 65 Edition 97-01, Jun. 2001, 57 pages.

Oqo "A Full PC That Fits in Your Pocket" Retrieved on Sep. 22, 2008 at <<http://www.oqo.com/support/documentation.html>>.

PCT Search Report for International Application No. PCT/US 08/57848, mailed Jul. 7, 2008 (9 pages).

Desmoulins et al., "Pattern-Based Annotations on E-books: From Personal to Shared Didactic Content", Proceedings of the IEEE International Workshop on Wireless adn Mobile Techniques in Education, 2002, 4 pages.

Leach et al, "A Universally Unique IDentifier (UUID) URN Namespace", Jul. 2005, IETF, retrieved on Apr. 21, 2010 at http://tools.ietf.org/pdf/rfc4122.pdf, 32 pgs.

* cited by examiner

INVARIANT REFERENCING IN DIGITAL WORKS

BACKGROUND

Electronic distribution of information has gained importance with the proliferation of personal computers and wide area networks such as the Internet. With the widespread use of the Internet, it has become possible to distribute large, coherent units of information, such as books, using electronic technologies. Books distributed using electronic technologies are commonly referred to as electronic books ("eBooks"). Various entities make eBooks available for download over ordinary Internet connections, such as broadband and dialup connections.

Typically, digital works are structured as virtual frames presented on a display device, and a user may turn or change from one virtual frame or "page" of electronic content to another. The term "page" as used herein refers to a collection of content that is presented at one time on a display. Thus, "pages" as described herein are not fixed permanently, and may be redefined or repaginated based on variances in display conditions, such as screen size, font type or size, margins, line spacing, resolution, or the like.

EBooks may be displayed and read on a variety of different display devices, such as computer monitors, portable digital assistants (PDAs), pocket personal computers (PCs), and specialized eBook reader devices, for example. The screen size of the various display options may vary greatly from one display device to another. For example, a computer monitor may have a screen size of twenty-one inches (measured diagonally) or more, while a pocket PC may have a screen size as small as a few inches. Simply by virtue of the larger screen size, more content can be displayed on the computer monitor at one time than on the pocket PC. Thus, content that appears on a certain page (e.g., page 10) of an eBook when displayed on a computer monitor may appear on a much later page (i.e., page 50) when displayed on a pocket PC or some other display device having a smaller screen size.

Font type also affects how much textual content can displayed on a display screen. Different fonts may have a different number of characters per inch and may have uniform or variable character widths. Perhaps more significantly, the size of the font also affects the amount of content displayed on a display screen. Generally, the smaller the font size, the more text that will fit on the display screen, and vice versa.

These and other display conditions (e.g., screen resolution, margins, line spacing, etc.) affect the amount of content that can be displayed on a given display screen. Accordingly, it may be difficult or impossible for a user reading an eBook on one display device to meaningfully communicate a page cite to a reader of the same eBook on another display device, because one or more of the foregoing display conditions may be different. For example, when a reader cites a meaningful quotation on page 27, line 3, this citation is likely to not be accurate for most other readers.

Another problem may arise when a user is in the middle of reading an eBook and decides to change the font type, font size, margins, or some other display condition. In that case, the user probably knows what page he or she was reading prior to the change in display condition. However, after the change, the content the user was previously reading will likely be found on a different page of the eBook, and the user may not be able to easily locate the place where he or she left off.

Thus, there remains a need to improve a method of identifying or referencing material within electronic content to improve a reader's ability to navigate within an eBook and to better identify a location within the eBook content.

SUMMARY

In view of the above, this disclosure describes ways of invariantly referencing locations within an electronic book, electronic content, or other digital work regardless of screen size, font size, or other variations in display of the digital work. In one aspect, a method of presenting a digital work includes displaying a portion of the digital work on a display screen under a set of display conditions, and providing one or more invariant location reference identifiers corresponding to the portion of the digital work on the display screen. The invariant location reference identifiers are separate from the digital work, and each invariant location reference identifier is provided along with the corresponding portion of the digital work, regardless of the display conditions under which the portion of the digital work is displayed.

In another aspect, a method of indexing a digital work includes partitioning the digital work into a plurality of segments, generating a plurality of location reference identifiers, and sequentially assigning each segment of the digital work a unique location reference identifier. Each location reference identifier is uniquely assigned with a corresponding segment of the digital work, regardless of display conditions under which the digital work is displayed.

In still another aspect, a data structure of a digital work is stored on one or more computer-readable media. The data structure includes a first data field containing a header identifying content of the data structure, a second data field comprising data representing a digital work including text, and a third data field comprising invariant location reference identifiers. Each invariant location reference identifier is associated with a location in the digital work, such that when the data structure is read by a computer, each invariant location reference identifier is provided along with the associated portion of the digital work, regardless of display conditions under which the portion of the digital work is displayed by the computer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As mentioned above, a problem arises when attempting to identify and communicate a page or position within a digital work, due to the variable screen size, font type or size, margins, line spacing, resolution, and other variable display conditions of the display devices. This problem arises because the virtual frames or "pages" displayed on the display device are not fixed permanently, and may be redefined or repaginated based on variances in the display conditions. This disclosure is directed to invariant referencing of locations within a digital work, which allows a user to accurately reference a location within a digital work, regardless of screen size, font type, font size, or other variations in display conditions of the digital work.

In exemplary implementations described herein, the invariant location referencing is described in the context of an electronic book ("eBook"). The terms "eBook" and "digital work" are used synonymously and, as used herein, may include electronic or digital representations of printed works, as well as original electronic or digital content that may include text, multimedia, hypertext and/or hypermedia. Examples of eBooks and/or digital works include, but are not limited to, books, magazines, newspapers, periodicals, journals, reference materials, telephone books, textbooks, anthologies, instruction manuals, proceedings of meetings, forms, directories, maps, etc. Also, while various aspects and features are described herein as applied to an eBook reader, the concepts may be implemented in other electronic devices or electronic readers besides eBook reader devices including, for example, personal computers, portable computers (e.g., laptops or pocket PCs), personal digital assistants (PDAs), portable gaming devices, wireless phones, and the like.

Figure 1:
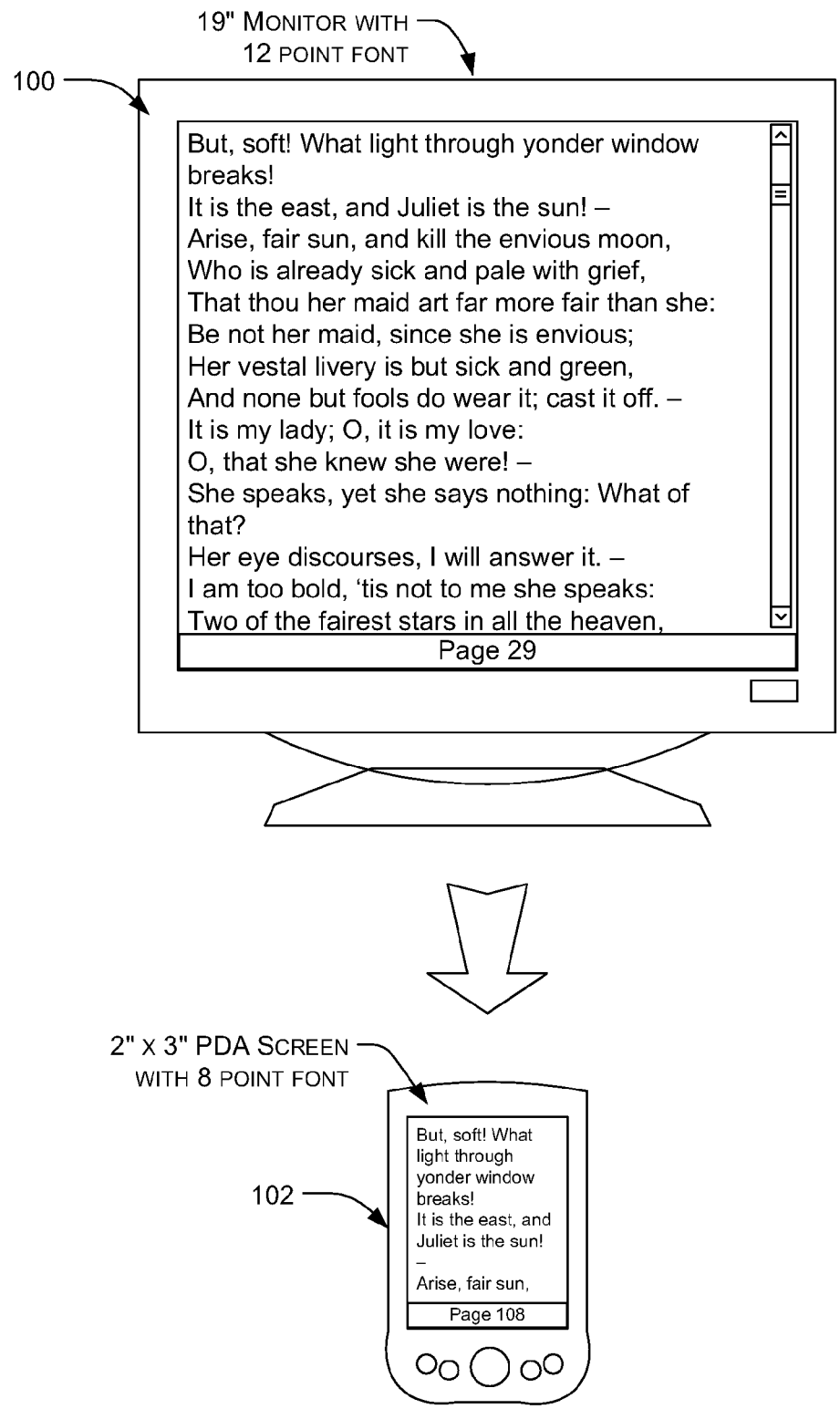
FIG. 1 illustrates an implementation in which two display devices are displaying content of the same electronic book ("eBook"), along with a conventional page number on which the displayed content appears.

FIG. 1 illustrates the problems arising from variable display conditions of display devices. FIG. 1 shows two display devices displaying a portion of a Romeo and Juliet eBook. One display device is a nineteen-inch computer monitor 100 displaying the eBook in twelve point font. The second display device is a PDA 102 with a two-inch by three-inch screen, displaying the eBook in eight point font. As shown in FIG. 1, both display devices 100 and 102 are displaying content from the same location in the eBook. However, the computer monitor 100 indicates that the displayed content can be found on virtual frame or page twenty-nine of the eBook, while the PDA 102 indicates that the displayed content is on virtual page one hundred eight of the eBook. This difference in page number is due to the different display conditions of the two display devices, and makes it difficult for a user of the eBook to refer another user to specific content in the eBook. For example, a user reading Romeo and Juliet on the nineteen inch monitor 100, would be unable to easily tell a user reading Romeo and Juliet on the PDA 102 where to go to read Romeo's metaphor: "Juliet is the sun!"

Figure 2:
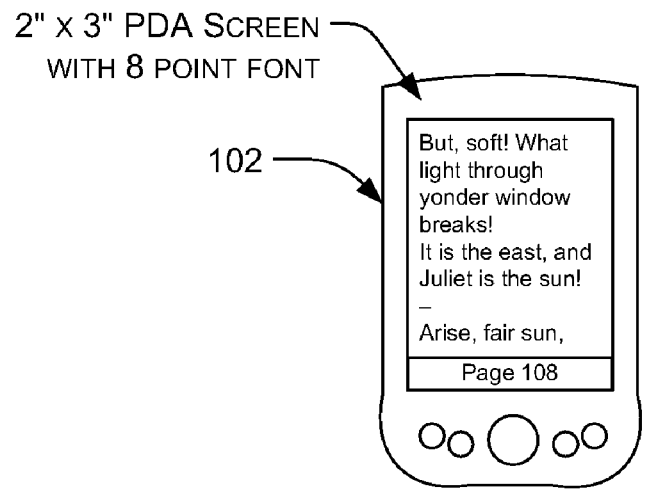
FIG. 2 illustrates another implementation in which two display devices are displaying content of the same eBook, along with a conventional page number on which the displayed content appears.
Figure 2:
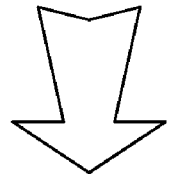
Figure 2:
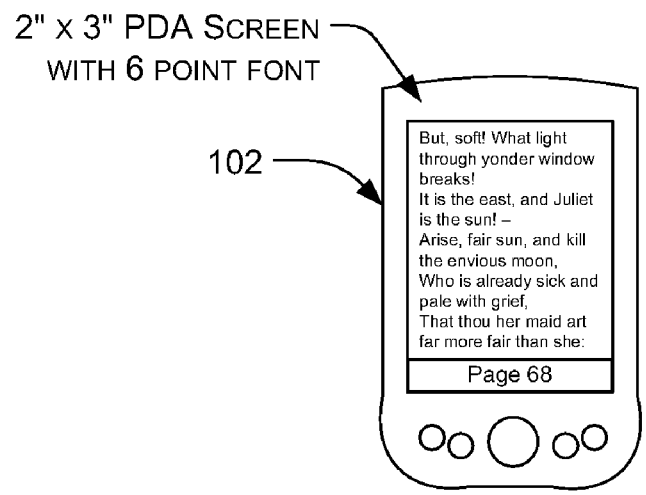

FIG. 2 illustrates a similar problem that arises if the user of one of the display devices decides to change the font size of the eBook, which would affect the virtual pagination of the eBook. For example, suppose that after putting on his reading glasses, the user reading Romeo and Juliet on the PDA 102 decides to change the font size to six point so that he does not have to turn the virtual page as frequently. In that case, Romeo's metaphor "Juliet is the Sun!" would appear on an earlier virtual page of the eBook, such as page sixty-eight for example, since more text would fit on each displayed page. The user may then have difficulty locating the point where he left off reading prior to the change in display conditions.

Figure 3:
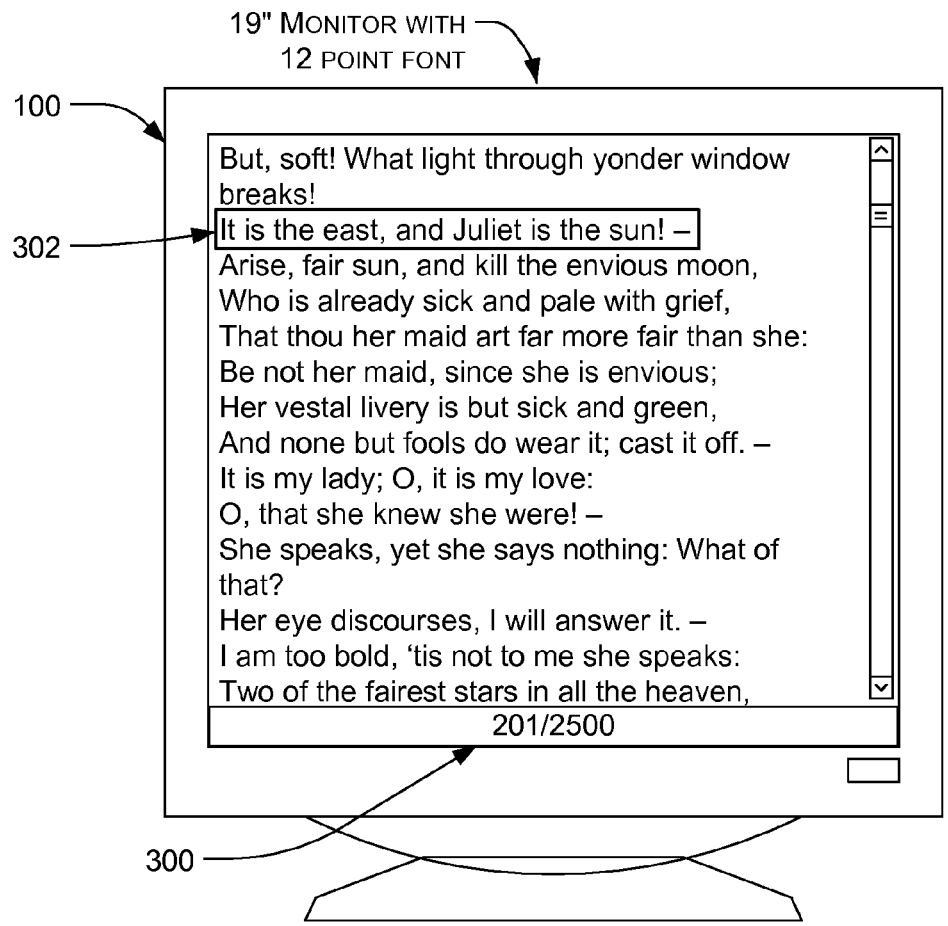
FIG. 3 illustrates another implementation in which two exemplary display devices are displaying content of the same eBook, along with a location reference identifier identifying a location in the eBook at which the displayed content appears.
Figure 3:
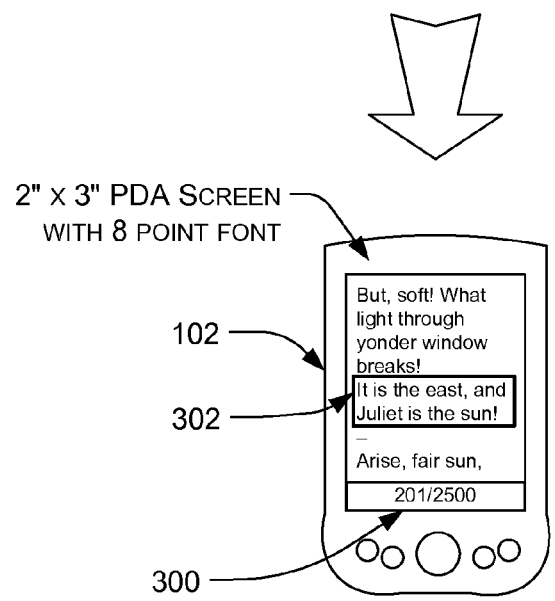

FIG. 3 illustrates an exemplary invariant location referencing scheme that remedies the forgoing problems related to variations in display conditions. As shown in FIG. 3, a Romeo and Juliet eBook is again displayed by two different display devices 100 and 102 having different display conditions. However, in this case, rather than displaying a virtual page number, which could change with changes in display conditions, the display devices display an invariant location reference identifier 300 corresponding to at least a portion of the displayed content 302 (shown in a text box for clarity). The invariant location reference identifier 300 is a unique identifier that corresponds to a specific location or segment of content 302 in the eBook, which is not affected by changes in screen size, font type or size, resolution, or other display conditions. Thus, the invariant location reference identifier 300 provides a reference to the assigned text 302 regardless of display conditions of the display device. This allows users to easily convey a location of specific eBook content to other users reading the same eBook on other display devices and/or under different display conditions. In addition, the invariant location referencing scheme allows the display device to identify a location where a reader left off reading, even after a change in font type or size, margins, line spacing, and/or some other display condition. Consequently, a user is readily able to find a place where he or she left off reading, regardless of any changes in the display conditions.

In the implementation shown in FIG. 3, the invariant location reference identifier 300 is provided along with a total number of location references in the eBook (in this case 201 is the invariant location reference identifier and 2500 is the total number of location references in the eBook). This allows a user to know approximately where in the eBook the displayed content is found (in this case a little less than a tenth of the way through the eBook). However, the total number of location reference identifiers need not be provided, and the invariant location reference identifier 300 may be displayed alone or in combination with one or more other types of information, such as chapter, section, eBook title, author, reading time, or the like. In other embodiments, the invariant location reference identifier 300 may be within a chapter, section or the like (e.g., "Chapter 7, 201/900" to indicate location 201 of a total of 900 location references within Chapter 7).

Also, the invariant location reference identifier 300 is shown in a navigation bar 302 along the bottom of the display screen. However, in other implementations, the invariant location reference identifier 300 may be displayed in other locations on the screen and may be displayed continuously, periodically, and/or upon request of the user. For example, the invariant location reference identifier 300 could be displayed along the top of the display screen, along a side of the display screen, overlaid over content of the eBook, in a drop-down menu, or in any other known user interface or display technique. In another example, invariant location reference identifiers may be displayed upon a user selecting or pointing to a portion of the eBook or a location in the eBook corresponding to the given invariant location reference identifier.

Before discussing these and other invariant location referencing implementations in detail, an exemplary display device will be briefly described to provide context for the invariant location referencing techniques.

Exemplary eBook Reader Device

Figure 4:
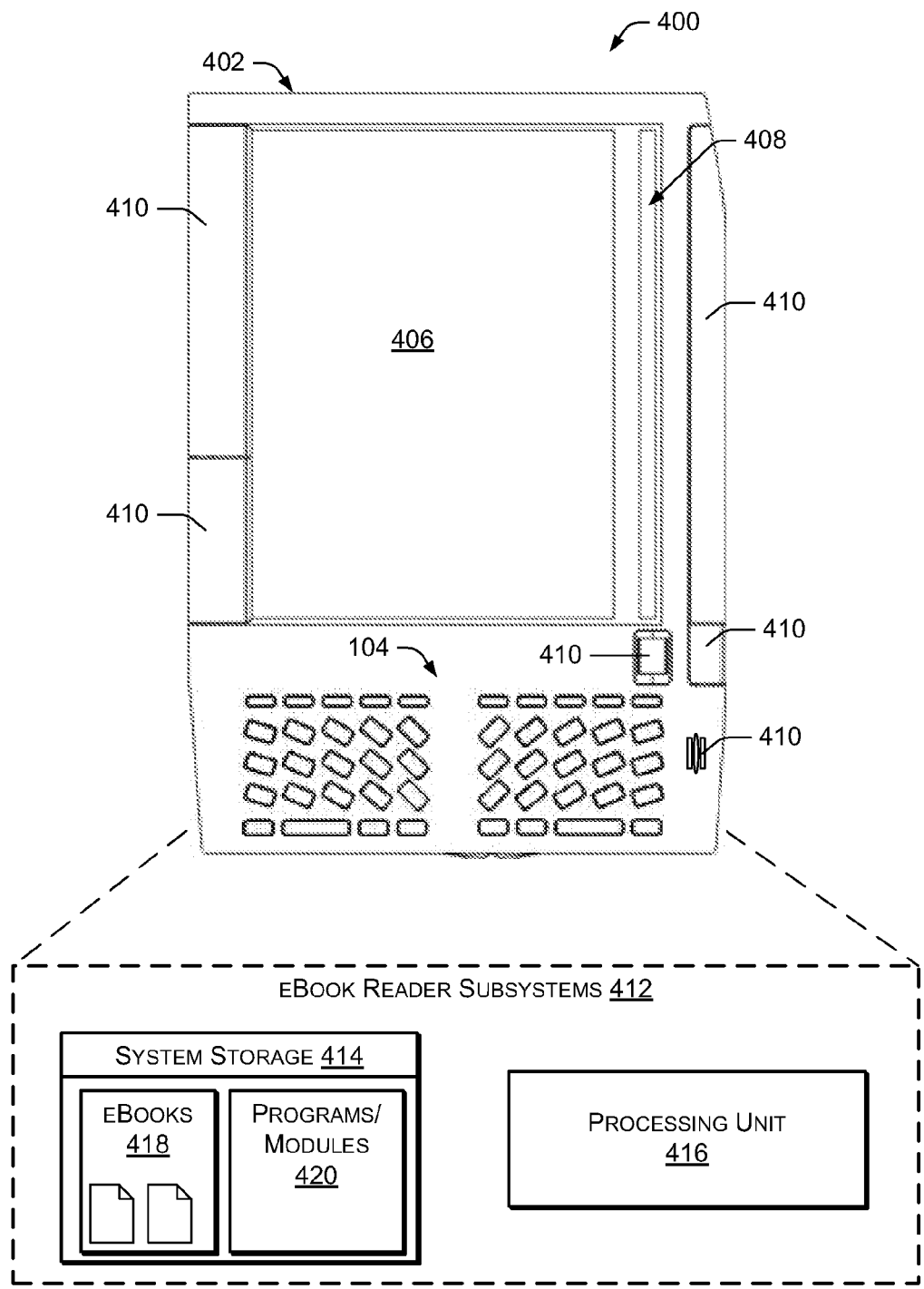
FIG. 4 illustrates an exemplary eBook reader device according to one implementation.

FIG. 4 illustrates one suitable display device 400 capable of employing invariant referencing techniques. However, virtually any other type of display device may be used to implement the invariant referencing described herein. In the illustrated implementation, the device 400 is embodied as a handheld eBook reader device. Various features of the display device 400 are described briefly below. However, a fuller description of this exemplary display device may be found in U.S. patent application Ser. No. 11/277,893, filed Mar. 29, 2006, and entitled "Handheld Electronic Book Reader Device Having Dual Displays," which is incorporated herein by reference.

As shown in FIG. 4, the eBook reader device 400 has a body or housing 402, a keyboard 404, and a dual display system comprised of a first display 406 and a second display 408. The device keyboard 404 includes a plurality of alphabetic, numeric, and/or function keys for entry of user input.

The first display 406 in the dual display system presents content in a human-readable format to the user. The content presented in the first display 406 may be digital works, such as electronic books, newspapers, or other readable or viewable materials. For example, the display 406 provides the text of the electronic books and also depicts any illustrations, tables, or graphic elements that might be contained in the electronic books.

The second display 408 of the dual display system is a narrow screen located adjacent to the content display 406. The narrow display 408 is illustrated as being positioned to the right of the content display 406, although it may be located elsewhere in the housing 402 in other implementations. The narrow display screen 408 may be responsive to user input registered via, for example, a finger, a stylus, or other similar pointing device. Additionally, the narrow display screen 408 may enable presentation of graphic elements that correspond to content displayed in the content display 406.

The eBook reader device 400 may also include a variety of user inputs 410 to navigate through and among eBooks and digital works. Examples of user inputs that may be present include buttons, scroll wheels, thumb wheels, thumb sticks, sensors that detect and register movement of a user's thumb or finger, tactile sensors, or any other conventional user input mechanism.

The eBook reader device 400 also has various internal components, which are referred to generally as eBook reader subsystems 412. In one implementation, the subsystems 412 include system storage 414 and a processing unit 416. The processing unit 416 interacts with the system storage 414 to facilitate operation of the eBook reader device 400. The system storage 414 may be used to store a plurality of eBooks 418 and other content, as well as software programs or other executable modules 420 that may be executed by the processing unit. Examples of such programs or modules might include indexing modules indexing eBooks with invariant location reference identifiers, reader programs, control modules (e.g., power management), network connection software, operating models, display drivers, sensor algorithms, page turn detectors, and the like.

The system storage 414 may include volatile memory (such as RAM), nonvolatile memory, removable memory, and/or non-removable memory, implemented in any method or technology for storage of information, such as computer-readable instructions, data structures, program modules, or other data. Also, the processing unit 416 may include onboard memory in addition to or instead of the system storage 414. Some examples of storage media that may be included in the system storage 414 and/or processing unit 416 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the eBook reader device 400. Any such computer storage media may be part of the eBook reader device 400.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer-readable media.

Overview of Invariant Location Referencing

Invariant location referencing makes it possible to meaningfully identify and communicate a specific location or segment of content in an eBook, regardless of screen size, font type or size, resolution, or other display conditions of the display device. Generally, this is accomplished by assigning unique reference identifiers at locations throughout the content of a digital work, or to individual segments of the digital work. These reference identifiers are not dependent on display conditions of a display device on which the digital work is displayed. In that sense, the reference characters are invariant. The invariant location reference identifiers may be provided in addition to any dividing indicia in the digital work itself (e.g., page numbers, chapter numbers, book numbers, section numbers, etc.) and any virtual (variable) page numbering, or may be provided instead of such dividing indicia and/or virtual page numbering. The invariant location reference identifiers provide a reliable means by which a user can determine a location of content in the digital work and approximately where the content is relative to the beginning and end of the digital work. Invariant location reference identifiers may also be used as a means of identifying a source of a quotation or excerpt from an eBook, or when one eBook references a passage from another eBook (e.g., See Shakespeare, "Romeo and Juliet", location 2105).

Figure 5:
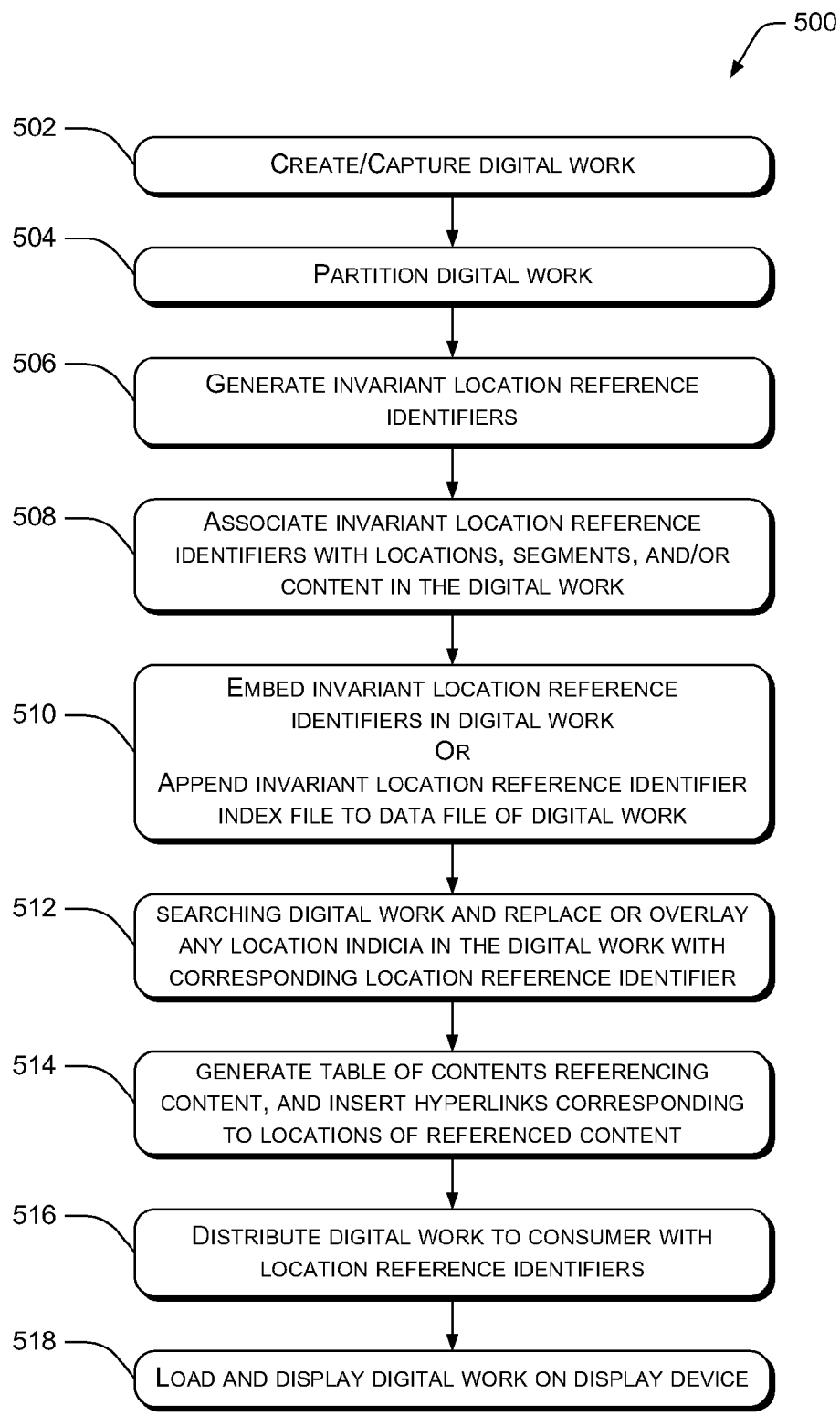
FIG. 5 is a flowchart showing an exemplary method of processing an eBook or other digital work to assign location reference identifiers prior to distribution to a consumer.
Figure 6:
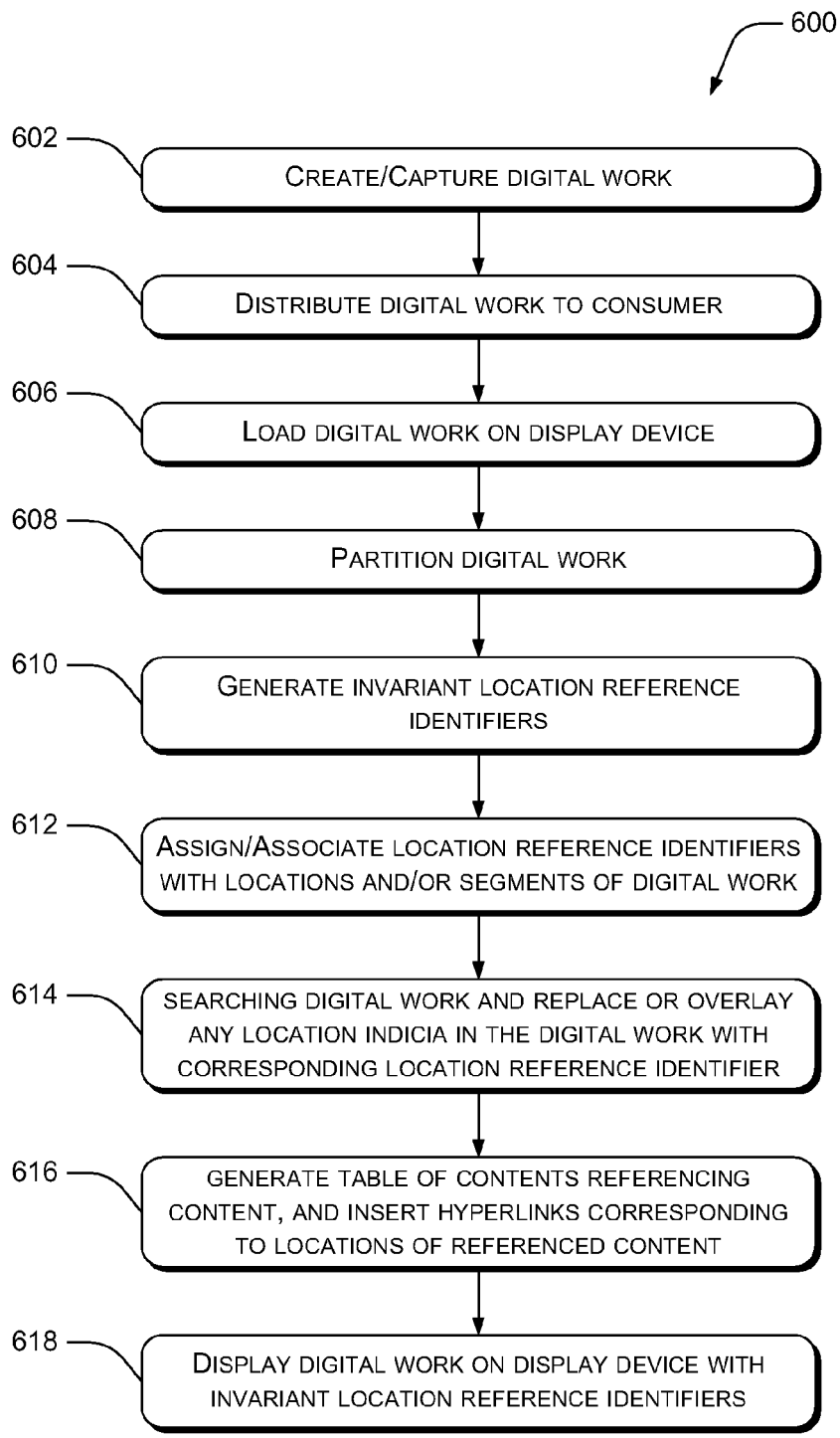
FIG. 6 is a flowchart showing an exemplary method of processing an eBook or other digital work to assign location reference identifiers after distribution to a consumer.
Figure 7:
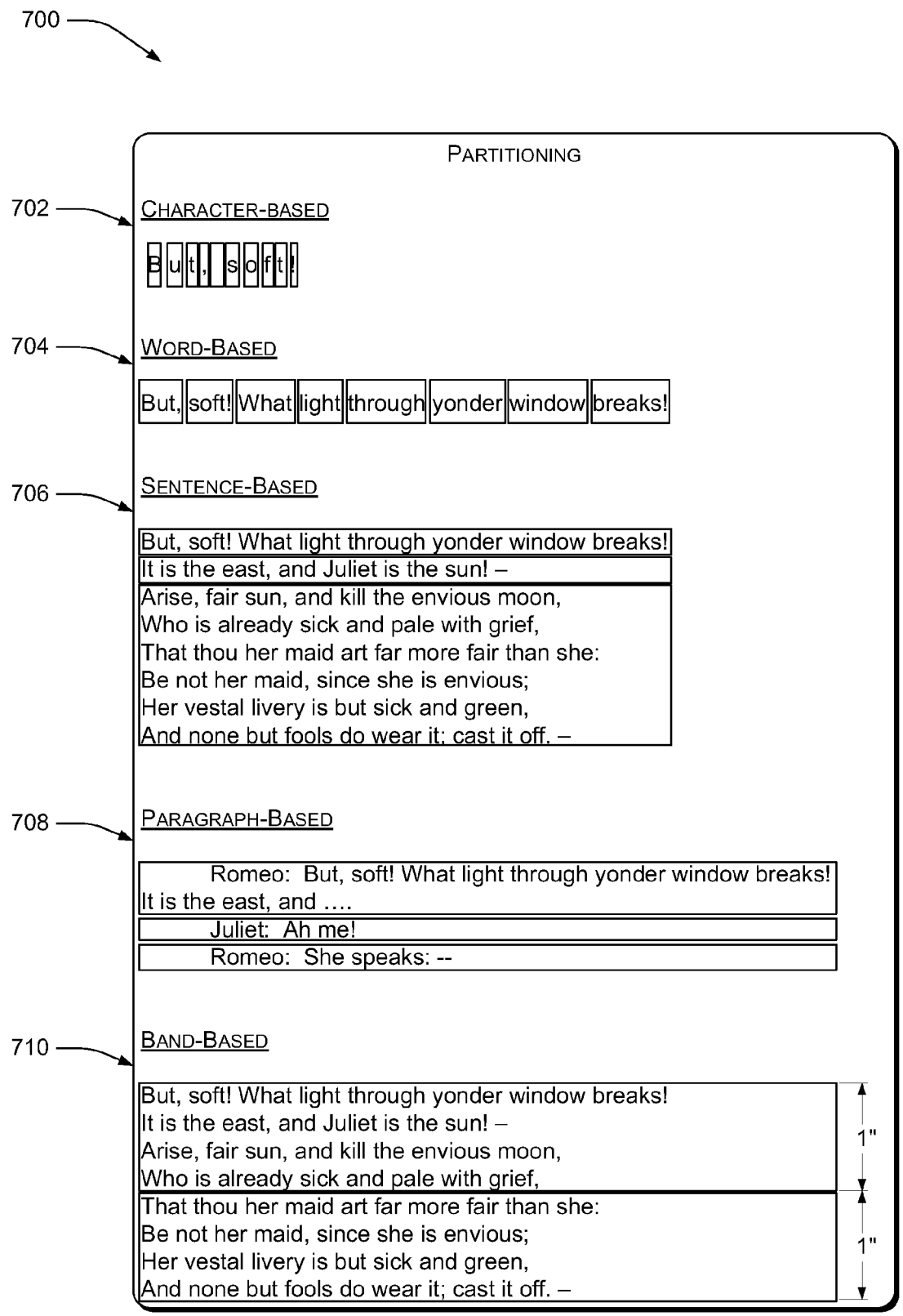
FIG. 7 is a block diagram showing several exemplary methods of partitioning an eBook or other digital work.

There are numerous ways of providing invariant location reference identifiers in, or in association with, content of a digital work. For example, invariant location reference identifiers may be embedded in, or appended to, a digital work after creation, but prior to distribution to a consumer. This approach is referred to herein as pre-processing. Alternatively, invariant location reference identifiers may be generated and associated with content of a digital work by a display device subsequent to distribution to a consumer and upon loading the digital work. This approach is referred to herein as post-processing. In still other implementations, a byte-count or address of data corresponding to content of the digital work may be used as the invariant location reference identifiers, in which case invariant location reference identifiers need not be specially generated. FIGS. 5-7 describe several exemplary methods of providing invariant location reference identifiers in, or in association with, content of a digital work.

Exemplary Preprocessing Method of Indexing a Digital Work

FIG. 5 is a flowchart showing an exemplary method 500 of indexing a digital work with invariant location reference identifiers prior to distribution to a consumer ("preprocessing"). The method 500 may apply to any digital work comprising at least some text. The method 500 begins, at 502, when a digital work is first captured (e.g., by scanning) from a printed document or film, or is created as an original digital work.

At 504, the digital work is partitioned into a plurality of segments. The digital work may be partitioned in numerous different ways. For example, in various implementations, each segment may correspond to an individual character, word, string of words, sentence, paragraph, or any other unit of textual content. Alternatively, each segment may correspond to a predetermined multiple of characters, words, sentences, or paragraphs (e.g., every tenth character, every other word, every fifth sentence, etc.). In still other implementations, the digital work may be partitioned into horizontal and/or vertical bands corresponding to predetermined areas of the original printed work (e.g., each segment may correspond to characters present in a one inch horizontal band of the original printed work). Each of these partitioning techniques will be described in more detail below with reference to FIG. 7.

A plurality of sequential, unique location reference identifiers is generated at 506, and, at 508, each segment of the digital work is sequentially assigned a unique location reference identifier. Thus, each location reference identifier is uniquely assigned to a corresponding segment of the digital work, regardless of display conditions under which the digital work is displayed. In other words, the location reference identifiers are invariant with respect to display conditions.

At 510, the invariant location reference identifiers are embedded, appended, or otherwise associated with locations or segments of the digital work. However, the location reference identifiers remain separate from the digital work in so far as the location reference identifiers are not characters of the digital work itself, but are separate identifiers that are associated with locations or segments of the digital work. Thus, the content of the digital work is unaltered by the provision of the location reference identifiers. Examples of ways in which the location reference identifiers may be associated with the digital work include attaching the location reference identifiers as meta data to the digital work, appending an index file of location reference identifiers to the digital work data file, and maintaining a location reference identifier index file apart from the digital work data file. However, location reference identifiers may also be associated with the digital work in any other known manner.

The digital work itself may or may not include some sort of indexing or dividing indicia of the content, such as page identifiers, chapter identifiers, section identifiers, figure identifiers, table identifiers, or the like. The invariant location references can be, but generally are not, based on any chapters, pages, or other dividing indicia in the body of the digital work. Thus, the location reference identifiers are generally generated independently of any location indicia in the digital work. Nevertheless, in some implementations, the location reference identifiers may be associated with the digital content based at least in part on location indicia in the digital work. In that case, at 512, the digital work may be searched for any dividing indicia in the digital work, and any such dividing indicia found may be replaced or overlaid with a corresponding invariant location reference identifier or a hyperlink to the same. Additionally, at 514, a table of contents may be generated, which references content of the digital work with hyperlinks to location reference identifiers corresponding to locations of the referenced content in the digital work.

Subsequently, at 516, the digital work is distributed to consumers along with the associated invariant location reference identifiers, and, at 518, the digital work may be loaded and displayed on a display device.

It should be understood that certain acts in method 500 need not be performed in the order described, may be modified and/or may be omitted entirely, depending on the circumstances. For example, the act 512 of searching for dividing indicia in the digital work and replacing or overlaying the dividing indicia with invariant location reference identifier and the act 514 of generating a table of contents can be omitted. Also, the order in which the acts of partitioning the digital work 504 and generating invariant location reference identifiers 506 are performed is not important and those acts may be reversed as desired.

Exemplary Post-Processing Method of Indexing a Digital Work

FIG. 6 is a flowchart showing an exemplary method 600 of indexing a digital work with invariant location reference identifiers subsequent to distribution to a consumer ("post-processing"). The method 600 is similar to that described above with respect to FIG. 5, except for the order and location at which invariant location reference identifiers are associated with a digital work. In this implementation, the invariant location reference identifiers are generated and associated with a digital work by the eBook reader or other display device, subsequent to distribution of the digital work to the consumer.

In method 600, the digital work is created or captured at 602, the digital work is distributed to consumers at 604, and loaded in memory of a display device at 606. At 608, the digital work is partitioned into segments by a program module in memory of the display device. Partitioning is performed in the same manner as discussed for method 500 above and explained further below with reference to FIG. 7. The program module of the display device also generates invariant location reference identifiers at 610, and, at 612, associates each invariant location reference identifier with a different location or segment of the partitioned digital work.

In some implementations, at 614, the program module of the display device may search the digital work for any dividing indicia in the digital work, and any such dividing indicia found may be replaced or overlaid with a corresponding invariant location reference identifier. Additionally, at 616, the program module of the display device may generate a table of contents, which references content of the digital work with hyperlinks to location reference identifiers corresponding to locations of the referenced content in the digital work.

One or more of acts 608-616 may be performed automatically upon loading the digital work for display at 606.

At 618, the digital work is displayed on the display device along with the invariant location reference identifiers.

It should be understood that certain acts in method 600 need not be performed in the order described, may be modified and/or may be omitted entirely, depending on the circumstances. For example, the act 614 of searching for dividing indicia in the digital work and replacing or overlaying the dividing indicia with invariant location reference identifier and the act 616 of generating a table of contents can be omitted. Also, the order in which the acts of partitioning the digital work 608 and generating invariant location reference identifiers 610 are performed is not important and those acts may be reversed as desired.

Exemplary Partitioning Methods

FIG. 7 is a block diagram illustrating some exemplary methods of partitioning a digital work, which may, but need not necessarily, be used to partition the digital work in the methods 500 and 600 described above. FIG. 7 shows five different partitioning approaches: character-based partitioning 702, word-based partitioning 704, sentence-based partitioning 706, paragraph-based partitioning 708, and band-based partitioning 710. In some implementations, each of these approaches may be applied such that each segment into which the digital work is partitioned contains approximately the same amount of textual content. This uniformity of segments makes navigation within a digital work more intuitive, because a user can equate each invariant location reference identifier with a generally uniform amount of textual content. However, in other implementations, the segments may contain different amounts of textual content.

In the character-based approach 702, the digital work is partitioned such that each character of the digital work is a separate segment. Thus, in the implementation shown, the phrase "But, soft!" is partitioned into ten segments. This approach provides the highest resolution of referencing within the digital work, but also requires the most processing resources and generates the largest index file of location references.

In the word-based approach 704, the digital work is partitioned such that each word of the digital work is a separate segment. For the purposes of this approach, each set of successively arranged characters separated by a space before and a space after will be treated as a word. Thus, in the implementation shown, the phrase "But, soft! What light through yonder window breaks!" is partitioned into eight segments. This approach provides somewhat lower resolution of referencing within the digital work, but also requires proportionately less processing resources and generates a proportionately smaller index file than the character-based approach.

In the sentence-based approach 706, the digital work is partitioned such that each sentence of the digital work is a separate segment. For the purposes of this approach, any string of characters beginning with the first character of the digital work, the first character following a period, or the first character following a hard return, and ending with a period, question mark, or exclamation point will be treated as a sentence. Thus, the passage shown in this implementation has been partitioned into three segments. This approach provides still lower resolution of referencing within the digital work, but also requires proportionately less processing resources and generates a proportionately smaller index file than the word-based approach.

In the paragraph-based approach 708, the digital work is partitioned such that each paragraph of the digital work is a separate segment. For the purposes of this approach, any string of characters beginning with the first character of the digital work, the first character following a hard return, and the first character following a tab indention, and ending with a hard return will be treated as a paragraph. Thus, the passage shown in this implementation has been partitioned into three segments. This approach provides still lower resolution of referencing within the digital work, but also requires proportionately less processing resources and generates a proportionately smaller index file than the sentence-based approach.

In each of the foregoing character-, word-, sentence-, and paragraph-based approaches, images (e.g., tables, figures, charts, and other non-text subject matter) in a digital work may be treated as a predetermined number of one or more segments, and assigned one or more invariant location reference identifiers corresponding to the assigned segments. That is, every image, regardless of display size, resolution, file size, or other display conditions, may be assigned a predetermined number of one or more invariant location reference identifiers. For example, every image in a digital work may be assigned a single invariant location reference identifier, which may be the next sequential invariant location reference identifier following the invariant location reference identifier assigned to text preceding the image. Alternatively, each image may be assigned any other predetermined number of invariant location reference identifiers.

In other implementations, images may be proportionately assigned invariant location reference identifiers, based on the size of data corresponding to the image. That is, an image might be assigned one invariant location reference identifier for each byte (or multiple bytes) of data of the image. In other implementations, images may be treated as if they were one or more words (e.g., all images are treated as one word, or small images are treated as ten words while large images are treated as fifty words). In still other implementations, an image may be assigned a number of invariant location reference identifiers corresponding to an amount of text occupying approximately the same amount of data as the image (e.g., if an image is represented by about the same amount of data as thirty characters, the image will be assigned the same number of invariant location reference identifiers as would thirty characters of text).

The band-based approach 710 may be applied if the digital work is scanned or otherwise captured from a printed document or film. In the band based approach 710, the digital work is partitioned into segments of text corresponding to predetermined areas of the printed document. The bands may be horizontal and/or vertical. In the example shown in FIG. 7, the digital work is partitioned into horizontal bands for every one inch of the printed document (or approximately one inch, to include an entire line of text or image). Each segment consists of the characters or images falling within the corresponding horizontal band. For the purposes of this approach, all the characters beginning with the first character in the band and ending with the last character in the band will be considered part of the segment corresponding to that band. Thus, the passage shown in this implementation has been partitioned into two segments.

In some implementations, the size of the bands may be based at least in part on the font size, line spacing, or other formatting of the original printed copy of the work. For example, it may be desirable to size the bands such that each band contains a predetermined number of lines of text. This approach tends to standardize the amount of textual content between successive invariant location reference identifiers by standardizing the number of lines of text corresponding to each invariant location reference identifier regardless of font size, line spacing, or other formatting. In an implementation in which the bands are sized to fit a predetermined number of lines, the band size will be larger for printed works having larger font size and/or line spacing. For example, four lines of double spaced text in fourteen point font will occupy a band size of about 1.5 inches, whereas four lines of single spaced text in ten point font will occupy a band size of about 0.75 inches.

The band-based approach 710 is well suited to partitioning digital works that include images, figures, charts, or other non-text objects, since the objects can be partitioned into bands in the same manner as text. In the character-, word-, sentence-, and paragraph-based approaches, such objects are generally treated as a predetermined number of one or more segments (e.g., an object corresponds to one segment, five segments, etc.), regardless of the size or shape of the object.

Each of the foregoing approaches may be done on an individual character-, word-, sentence-, paragraph-, or band-basis as shown in FIG. 7, or may be performed for a predetermined multiple of characters, words, sentences, paragraphs, or bands. For example, a digital work may be segmented every N characters, words, sentences, paragraphs, or bands, where N is any number greater than one.

Some implementations may employ a hybrid or combination of the foregoing partitioning approaches. In that case, the various partitioning approaches may be performed before distribution to consumers (preprocessing), after distribution to consumers (post-processing), or both. For example, in one exemplary implementation, a digital work may be coarsely partitioned using the band-based approach 710 during preprocessing, and then subsequently more finely partitioned (e.g., by a consumer's display device) using the character-based approach 702 or word-based approach 704.

Once a digital work has been indexed (and in some cases even without indexing), the digital work can be presented on a display device along with invariant location reference identifiers.

Exemplary Displays of Digital Works with Invariant Location Referencing

Figure 8:
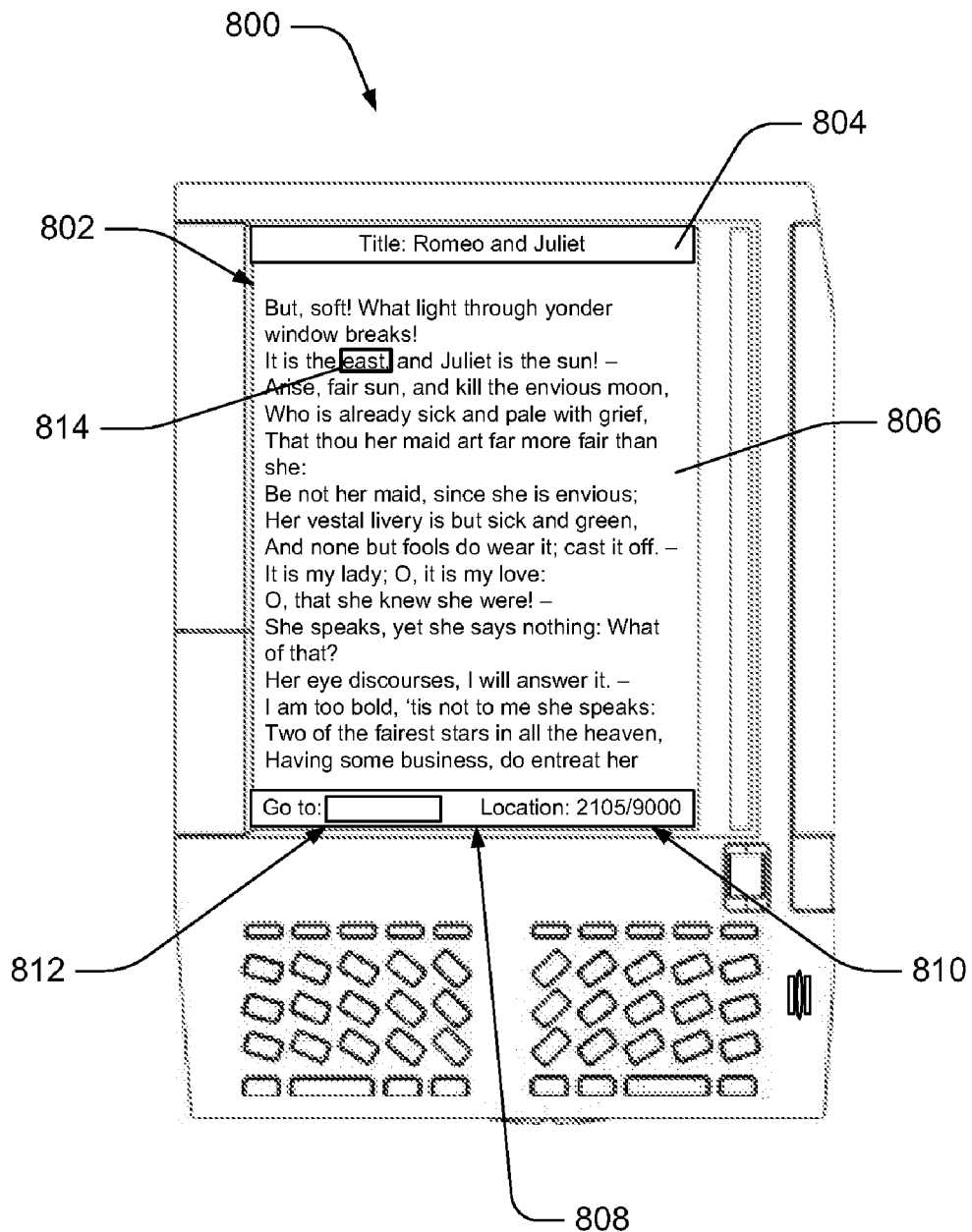
FIG. 8 shows how an eBook or other digital work might be displayed on the eBook reader device of FIG. 4, according to one exemplary display method.
Figure 9:
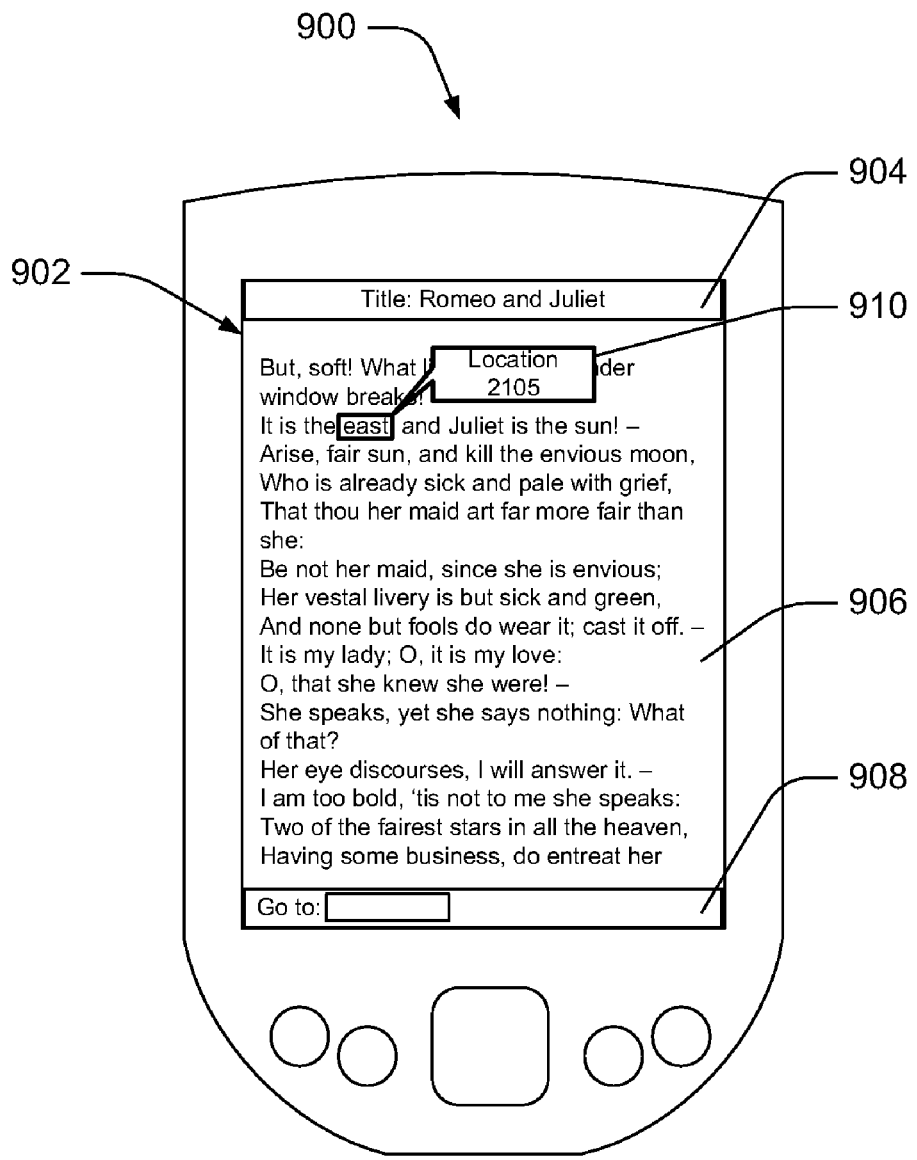
FIG. 9 shows how an eBook or other digital work might be displayed on a portable digital assistant (PDA), according to another exemplary display method.
Figure 10:
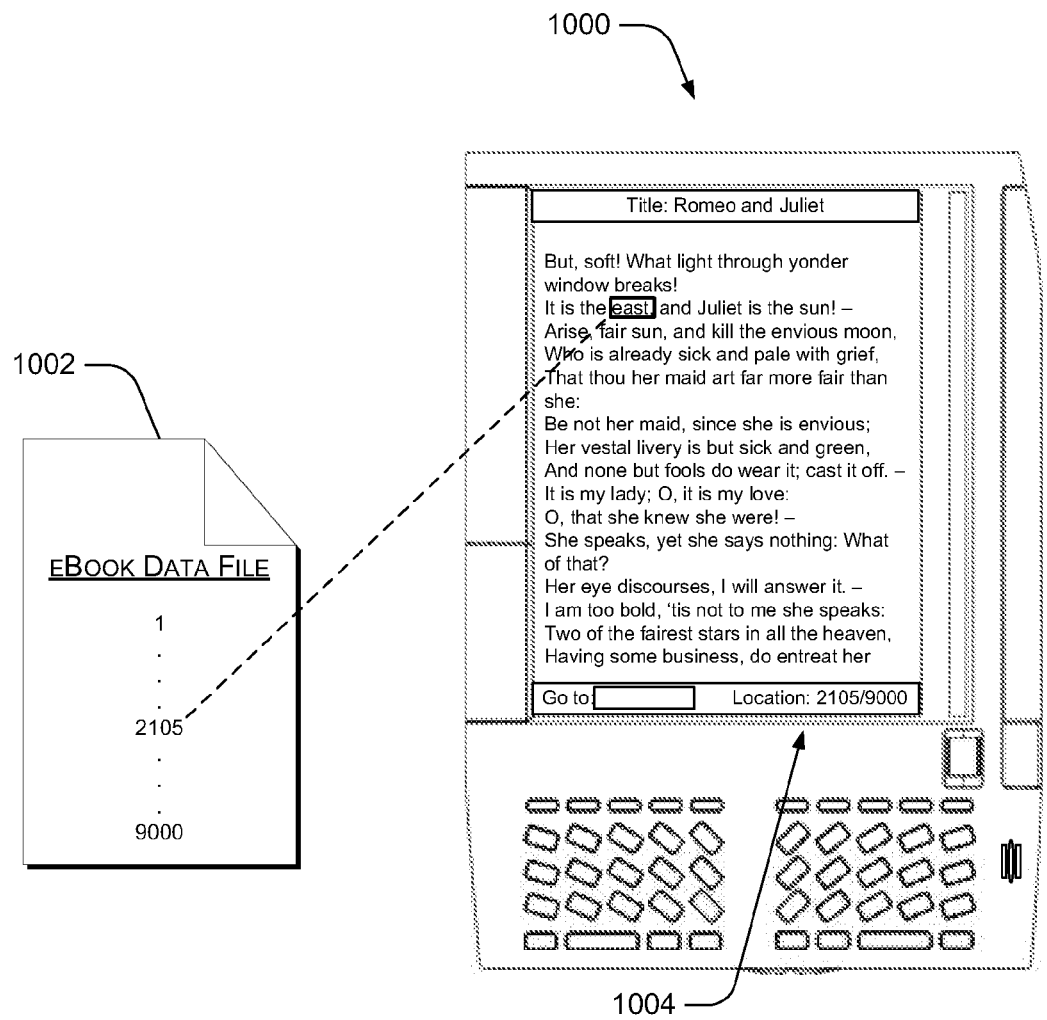
FIG. 10 is a schematic diagram illustrating an exemplary method of providing location reference identifiers for an eBook or other digital work, based on a byte-count or other unit of data.

FIGS. 8-10 illustrate display devices displaying digital works along with invariant location reference identifiers according to several exemplary implementations.

FIG. 8 shows an eBook reader 800 having a display screen 802, on which are displayed a header pane 804, a reading pane 806, and a navigation pane 808. The header pane 804 displays a title, author, date, time, or any other pertinent data to a user. The reading pane 806 displays content of an eBook or digital work for consumption by a user. The navigation pane 808 includes various interfaces that allow a user to easily navigate within and among eBooks and other content stored in memory or system storage of the eBook reader 800.

In the implementation shown, the navigation pane 808 includes a location field 810, showing a current invariant location reference identifier (in this case 2105) relative to the total number of location reference identifiers in the eBook (in this case 9000). The invariant location reference identifier displayed in the location field 810 may be the invariant location reference identifier corresponding to the first content displayed on the display screen (in this case "B," "But," "But, Soft," etc. depending on the how the eBook was partitioned), the last content on the display screen (in this case "r," "her," etc.), or some selected content 814 on the display screen (in this case the word "east" is selected). This allows a user to know and communicate precisely where he or she is currently reading in the eBook and where the current location is relative to the beginning and end of the eBook content.

A search field 812 is also provided in the navigation bar 808. A user may enter an invariant location reference identifier in the search field 812 to skip to the corresponding portion of the eBook content.

FIG. 9 illustrates a PDA device 900 having a display screen 902, on which are displayed a header pane 904, a reading pane 906, and a navigation pane 908 in a manner similar in most respects to that of FIG. 8 described above. However, in this implementation, instead of being displayed in the navigation bar, a location field 910 displaying the current invariant location reference identifier is overlaid over a portion of the reading pane 906 adjacent to a selected portion of the digital work. The location field 910 may be displayed upon user selection or pointing to a specific character, word, sentence, paragraph, or other portion of the digital work. In the implementation shown, a user has selected the word "east" and in response the location field 910 has been displayed in a callout window adjacent the word east indicating the current invariant location reference identifier (in this case 2105). Location field 910 may be displayed upon request from the reader or upon other triggering type events or commands (e.g., save ending location, re-opening of file to last place left off, etc.).

FIG. 10 shows an exemplary way in which a digital work may be displayed with invariant location reference identifiers without the need to index the digital work. In this implementation, a location within the digital work is determined based on a byte-count or some other unit of data of the underlying digital work.

Each character in a digital work is represented by units of data. Each unit of data corresponds to some portion of the digital work. For example, each byte of data generally corresponds to about one character of the digital work. Accordingly, to determine a location of content within a digital work, it is possible to map the content to a byte of data corresponding to that content and determine the address or byte-count for that byte of data. The address or byte-count can then serve as an invariant location reference identifier for the digital work without any additional indexing. The current address or byte-count can then be provided relative to the total number of bytes in the file underlying the digital work to provide an indication of the current location relative to the beginning and end of the digital work.

In the implementation shown in FIG. 10, the user has selected or pointed to the word "east" in the displayed content. The first letter of the word "east" corresponds to byte number 2105 out of 9000 total bytes of data in an eBook data file 1002 residing in memory or system storage of the eBook reader. Accordingly, location field 1004 of the eBook reader 1000 displays the location 2105/9000. While this implementation is described in terms of byte-count, any other unit of data can alternatively be used as invariant location reference identifiers.

In some cases, such as where the digital work includes images in-line with text content, the byte-count may appear to jump at the point where the image is located, since the image may correspond to a significant amount of data. For example, as small image might consume 20,000 bytes or more. To counteract this jumping appearance, the images may be stored at the beginning or end of the text content, and then the images may be referred to from within the text via image pointers of fixed or heuristically chosen byte sizes.

Exemplary Method of Presenting a Digital Work

Figure 11:
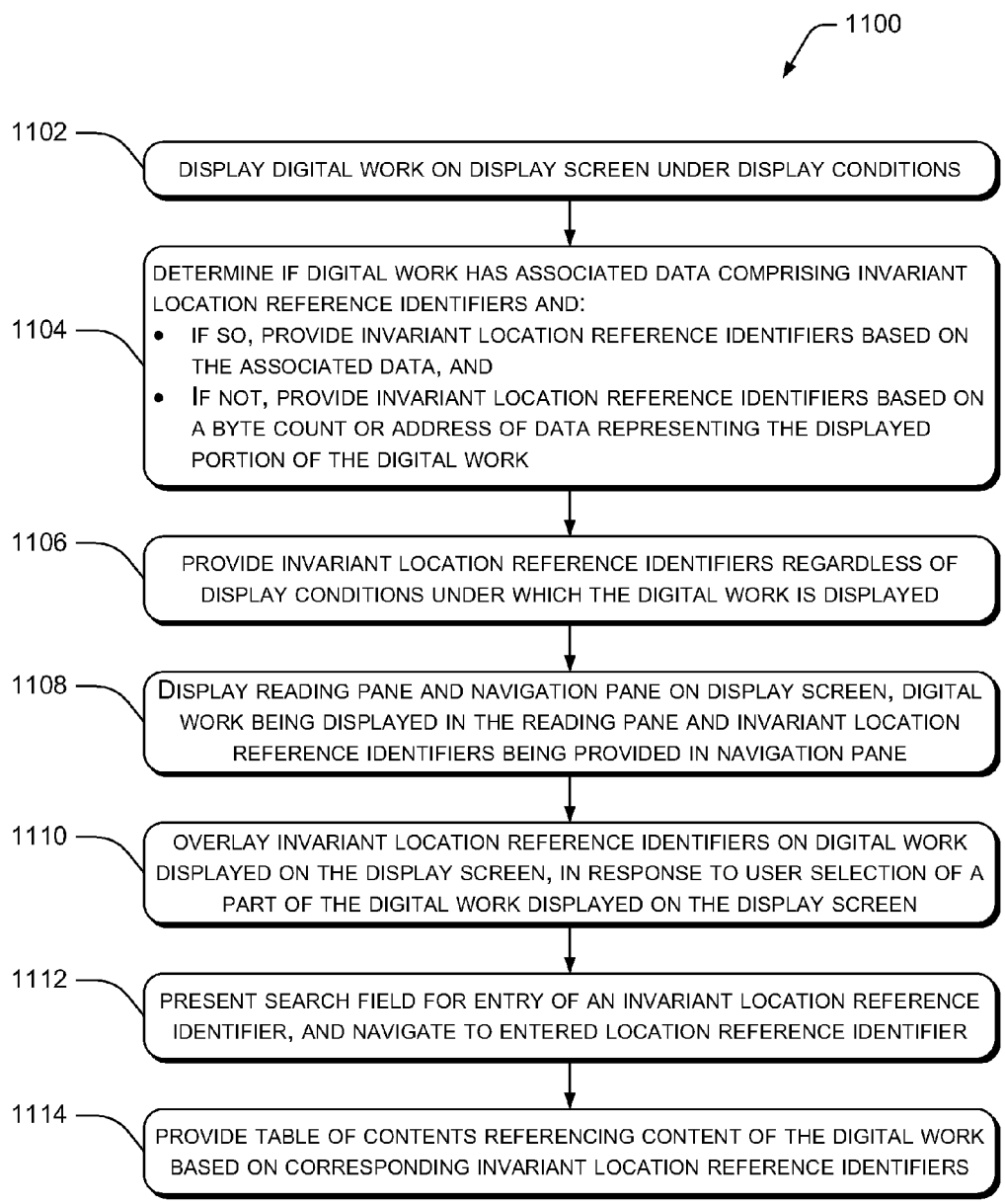
FIG. 11 is a flowchart showing an exemplary method of displaying an eBook or other digital work.

FIG. 11 is a flow chart showing an exemplary method 1100 of presenting a digital work along with invariant location referencing which may be implemented using the eBook reader, a computer monitor, a PDA, or any other suitable display device. For simplicity, the method 1100 is described as being implemented on the eBook reader of FIG. 4. For the purposes of describing the method of FIG. 11, it is assumed that one or more eBooks or other digital works are already stored in memory of the eBook reader.

Referring to again to FIG. 11, method 1100 includes, at 1102, displaying a portion of an eBook or digital work on a display screen under a set of display conditions (e.g., type of display device, screen size, font size, etc.). At 1104, a determination is made as to whether the digital work has any associated data comprising invariant location reference identifiers. If data comprising invariant location reference identifiers are determined to be present, the invariant location reference identifiers will be provided on the display screen based on the associated data. If associated data comprising invariant location reference identifiers are determined to be absent, the invariant location reference identifiers will be provided based on a byte count or other unit of data representing the displayed portion of the digital work.

At 1106, one or more invariant location reference identifiers are displayed which correspond to the portion of the digital work on the display screen. The invariant location reference identifiers are separate from the digital work in the sense that the location reference identifiers are not characters of the digital work itself, but are separate identifiers that are associated with locations or segments of the digital work. Thus, the content of the digital work is unaltered by the provision of the location reference identifiers. The location reference identifiers may be associated with the digital work by attaching the location reference identifiers as meta data to the digital work, appending an index file of location reference identifiers to the digital work data file, maintaining a location reference identifier index file apart from the digital work data file, or in any other known manner. In this manner, each invariant location reference identifier is provided along with the corresponding portion of the digital work, regardless of the display conditions under which the portion of the digital work is displayed.

In some implementations, at 1108, display and reading panes are displayed on the display screen. In that case, the displayed portion of the digital work is displayed in the reading pane and the invariant location reference identifiers are provided in the navigation pane. Additionally or alternatively, at 1110, invariant location reference identifiers may be overlaid on the parts of the digital work with which the invariant location reference identifiers are respectively associated. Also additionally or alternatively, the invariant location reference identifiers are provided in response to user selection of or pointing to a part (e.g., a character, word, sentence, paragraph, object, or other content) of the digital work displayed on the display screen.

In various implementations, the invariant location reference identifiers may correspond to one or more characters, words, sentences, paragraphs, images, figures, bands, or objects of the digital work. The invariant location reference identifiers may include any combination of letters, numbers, punctuation, symbols, or other characters. For ease of use, it may be desirable that the invariant location reference identifiers are numerals and/or include an easily manageable number of characters (e.g., at most four characters). Also, the invariant location reference identifiers may, but need not, include a decimal point, comma, colon, or other punctuation (e.g., 210.5 or 2,105 or 2:1:05) to assist a user in navigating the digital work.

However, invariant location reference identifiers having any number of digits and/or characters may be used. For example, more digits or characters may be desirable in cases using a partitioning approach to partition a work into having more than 9999 segments (e.g., a work partitioned using the character-based approach and having more than 9999 characters, or a work partitioned using the byte-based approach and having more than 9999 bytes). Additionally or alternatively, works having more segments could be scaled down to a desired number of digits (e.g., by truncating the actual number of invariant location reference identifiers—123,456 truncated to 1,234, dividing by a predetermined factor determined factor, dividing by a factor heuristically determined on a per-title basis to optimize display, etc.).

It may be desirable in some instances to assign each invariant location reference identifier to a substantially uniform amount of content. Thus, in some implementations, shorter works may have fewer invariant location reference identifiers than longer works. However, in other implementations, digital works may have a standard number of invariant location reference identifiers (e.g., 9999). Regardless of the nature and length of the invariant location reference identifiers displayed, it may be possible in some implementations to allow for more specific or precise referencing within the digital work. For example, referring back to FIG. 8, even though the invariant location reference identifier is displayed as a four digit number (i.e., 2105), a user may enter a more specific invariant location reference identifier (e.g., 2105.25) in the search field and will be taken to the location of the more specific invariant location reference identifier in the digital work. This precision may be accomplished by, for example, partitioning the digital work into more segments than the displayed number of invariant location reference identifiers ("hidden precision"), or by interpolating a location within each segment as a percentage of the segment ("interpolation").

In the hidden precision approach, the digital work is partitioned into a larger number of segments than are displayed (e.g., work is partitioned into 999,999 segments, but the work is displayed as having 9,999 invariant location reference identifiers). Thus, a user is able to search within the additional two decimal places that are hidden and not displayed. In the interpolation approach, the work is partitioned into the same number of segments as displayed invariant location reference identifiers (e.g., 9,999), and the approximate location within the segment is determined as a percentage of the additional places of precision (e.g., 2105.25 is 25% of the way between segments 2105 and 2106). Thus, applying the interpolation approach to the example of FIG. 8, invariant location reference identifiers 2105.0-2105.24 correspond to the letter "E", 2105.25-2105.49 correspond to the letter "A", 2105.50-2105.74 correspond to the letter "S", and 2105.75-2105.99 correspond to the letter "T". The interpolation approach may also be implemented using the band-based partitioning approach, but partitioning each segment into a number of vertical bands equal to the inverse of the additional places of precision (e.g., 1/0.25=4 vertical bands), rounded up or down as necessary.

In some implementations, the method 1100 may further include, at 1112, presenting a search field for entry of an invariant location reference identifier and, in response to user entry of the invariant location reference identifier in the search field, updating the display screen to display a portion of the digital work corresponding to the entered invariant location reference identifier. Also in some implementations, the method 1100 may include, at 1114, providing a table of contents referencing content of the digital work based on corresponding invariant location reference identifiers.

It should be understood that certain acts in method 1100 need not be performed in the order described, may be modified and/or may be omitted entirely, depending on the circumstances. For example, any one or more of acts 1106-1114 may be omitted.

Moreover, any of the acts of any of the methods described herein may be implemented by a processor or other computing device based on instructions stored on one or more computer-readable media. Computer-readable media can be any available media that can be accessed by a preprocessing system, display device, and/or digital work, as appropriate. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the preprocessing system, display device, and/or digital work. Combinations of the any of the above should also be included within the scope of computer-readable media.

Data Structure of eBook

Figure 12:
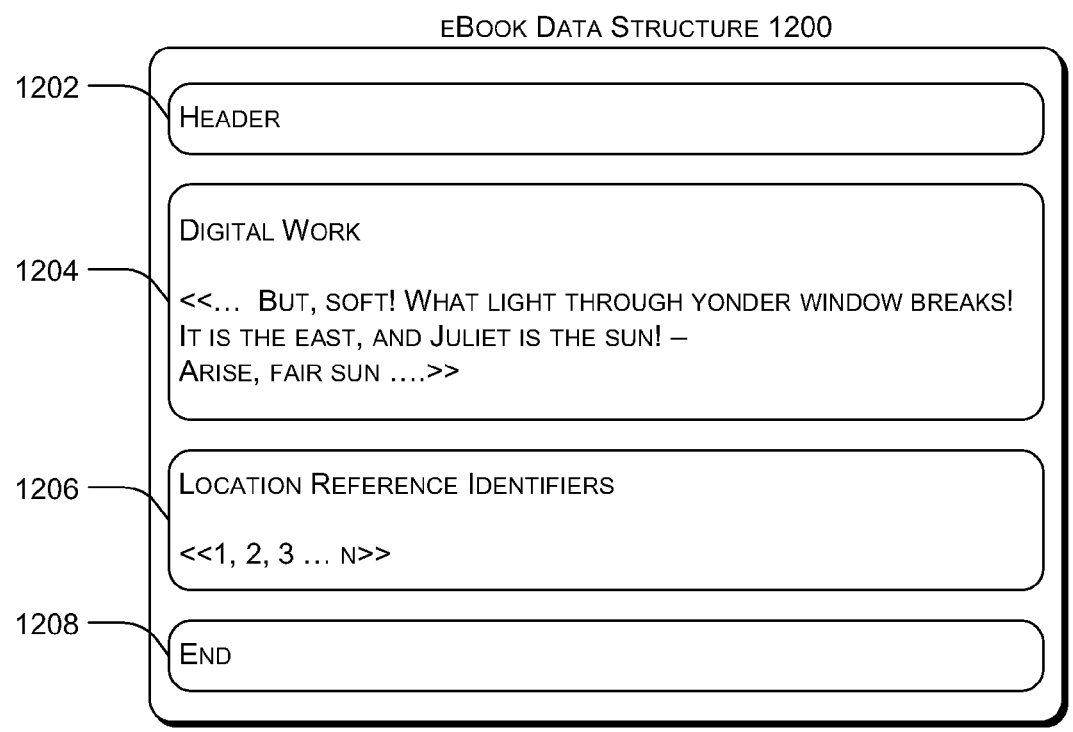
FIG. 12 is a block diagram illustrating an exemplary data structure of an eBook or other digital work.

FIG. 12 illustrates an exemplary eBook data structure 1200 including a header field 1202, a content field 1204 comprising data representing an eBook or digital work, a location reference field 1206 including an index of invariant location reference identifiers and an indication of the portions of the content to which they correspond, and an end data field 1208 designating an end of the data structure 1200. In this implementation, the invariant location reference identifiers are configured as a separate data field from the content of the digital work, but are part of the same data structure. The data structure 1200 may be in any desired programming language, and may include various other data fields as necessary or desired.

The location reference field 1206 may include a variety of other information regarding the invariant location reference identifiers and how they are indexed with respect to the digital work, such as, for example, a table of contents, a list of hyperlinks or pointers to various locations within the digital work, a list of byte-counts or addresses in the underlying file of the digital work, and/or any other information about how the digital work is indexed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. For example, the methodological acts need not be performed in the order or combinations described herein, and may be performed in any combination of one or more acts.

What is claimed is:

1. A method of presenting eBook content on an eBook reader device, the method comprising:
    displaying a portion of the eBook content on a display screen of the eBook reader device under a set of display conditions including a font size and a line spacing; and
    displaying on the display screen of the eBook reader device one or more invariant location reference identifiers based at least in part upon a byte-count corresponding to the portion of the eBook content displayed on the display screen, the one or more invariant location reference identifiers being separate from the eBook content, such that the eBook content is unaltered by the provision of the invariant location reference identifiers,
    wherein each invariant location reference identifier is provided along with the corresponding portion of the eBook content, regardless of the display conditions under which the portion of the eBook content is displayed.

2. The method of claim 1, further comprising displaying a reading pane and a navigation pane on the display screen of the eBook reader device, the portion of the eBook content being displayed in the reading pane and the one or more invariant location reference identifiers being provided in the navigation pane.

3. The method of claim 1, wherein each invariant location reference identifier corresponds to a text character, a word or string of words, a sentence, a paragraph, a figure, an image, a chart, a table, or a non-text object of the eBook content.

4. The method of claim 1, further comprising presenting a search field for entry of an invariant location reference identifier and, in response to user entry of an invariant location reference identifier in the search field, updating the display screen to display a portion of the eBook content corresponding to the entered invariant location reference identifier.

5. One or more computer-readable storage media comprising computer-readable instructions for implementing the method of claim 1.

6. An apparatus comprising:
    one or more processors; and
    memory to store computer-executable instructions that, when executed by the one or more processors, performs the method of claim 1.

7. A method of presenting a digital work on a display screen of an eBook reader device comprising text, the method comprising:
    displaying a portion of the digital work on the display screen of the eBook reader device under a set of display conditions; and
    providing on the display screen of the eBook reader device one or more invariant location reference identifiers based at least in part upon a byte-count corresponding to the portion of the digital work on the display screen, the invariant location reference identifiers being overlaid and displayed on the portion of the digital work displayed on the display screen,
    wherein each invariant location reference identifier is provided along with the corresponding portion of the digital work, regardless of the display conditions under which the portion of the digital work is displayed.

8. The method of claim 7, further comprising displaying a reading pane and a navigation pane on the display screen, the portion of the digital work being displayed in the reading pane and the invariant location reference identifier(s) being provided in the navigation pane.

9. The method of claim 7, wherein the invariant location reference identifier(s) are provided in response to user selection of a part of the digital work displayed on the display screen.

10. The method of claim 7, wherein each text character of the digital work has a corresponding invariant location reference identifier.

11. The method of claim 7, wherein each word or string of words of the digital work has a corresponding invariant location reference identifier.

12. The method of claim 7, wherein each sentence of the digital work has a corresponding invariant location reference identifier.

13. The method of claim 7, wherein each paragraph of the digital work has a corresponding invariant location reference identifier.

14. The method of claim 7, wherein each image, figure, table, chart, and non-text object of the digital work has a corresponding invariant location reference identifier.

15. The method of claim 7, wherein each invariant location reference identifier comprises a numeric identifier having at most four digits.

16. The method of claim 7, further comprising determining if the digital work has associated data comprising invariant location reference identifiers, and based on this determination:
   providing the invariant location reference identifiers based on the associated data comprising invariant location reference identifiers, if associated data comprising invariant location reference identifiers is determined to be present, and
   providing the invariant location reference identifiers based on a byte number of data representing the displayed portion of the digital work, if associated data comprising invariant location reference identifiers is determined to be absent.

17. The method of claim 7, further comprising presenting a search field for entry of an invariant location reference identifier and, in response to user entry of an invariant location reference identifier in the search field, updating the display screen to display a portion of the digital work corresponding to the entered invariant location reference identifier.

18. The method of claim 7, further comprising providing a table of contents referencing content of the digital work based on corresponding invariant location reference identifiers.

19. One or more computer-readable storage media comprising computer-readable instructions for implementing the method of claim 7.

20. An apparatus comprising:
   one or more processors; and
   memory to store computer-executable instructions that, when executed by the one or more processors, performs the method of claim 7.

21. A method of presenting electronic content on an electronic reader device, the method comprising:
   displaying a reading pane and a navigation pane on a display screen of the electronic reader device;
   displaying a portion of the electronic content in the reading pane displayed on the display screen of the electronic reader device under a set of display conditions including a font size and a line spacing; and
   providing in the navigation pane on the display screen of the electronic reader device one or more invariant location reference identifiers based at least in part upon a byte-count corresponding to the portion of the electronic content displayed on the display screen, the invariant location reference identifiers being separate from the electronic content, such that the electronic content is unaltered by the provision of the location reference identifiers,
   wherein each invariant location reference identifier is provided along with the corresponding portion of the electronic content, regardless of the display conditions under which the portion of the electronic content is displayed.

22. The method of claim 21, wherein each invariant location reference identifier corresponds to a text character, a word or string of words, a sentence, a paragraph, a figure, an image, a chart, a table, or a non-text object of the electronic content.

23. The method of claim 21, further comprising determining if the electronic content has associated data comprising invariant location reference identifiers, and based on this determination:
   providing the invariant location reference identifiers based on the associated data comprising invariant location reference identifiers, if associated data comprising invariant location reference identifiers is determined to be present, and
   providing the invariant location reference identifiers based on a byte number of data representing the displayed portion of the electronic content, if associated data comprising invariant location reference identifiers is determined to be absent.

24. The method of claim 21, wherein the electronic content is an electronic book.

25. One or more computer-readable storage media comprising computer-readable instructions for implementing the method of claim 21.

26. An apparatus comprising:
   one or more processors; and
   memory to store computer-executable instructions that, when executed by the one or more processors, performs the method of claim 21.

27. One or more computer-readable storage media storing computer-executable instructions for presenting eBook content on an eBook reader device, the instructions when executed cause a computing device to perform acts comprising:
   displaying a portion of the eBook content on a display screen of the eBook reader device under a set of display conditions including a font size and a line spacing;
   determining if the eBook content has associated data comprising one or more invariant location reference identifiers, the one or more invariant location reference identifiers being separate from the eBook content, such that the eBook content is unaltered by the provision of the location reference identifiers, and based at least in part on this determination:
      displaying on the display screen of the eBook reader device the one or more invariant location reference identifiers based at least in part on the associated data comprising the one or more invariant location reference identifiers, corresponding to the portion of the eBook content displayed on the display screen, if associated data comprising the one or more invariant location reference identifiers is determined to be present, and
      displaying on the display screen of the eBook reader device the one or more invariant location reference identifiers based at least in part on a byte-count of data representing the displayed portion of the eBook content, if associated data comprising invariant location reference identifiers is determined to be absent; and
   wherein each invariant location reference identifier is provided along with the corresponding portion of the eBook content, regardless of the display conditions under which the portion of the eBook content is displayed.

* * * * *